United States Patent
Oh et al.

(10) Patent No.: US 10,887,577 B2
(45) Date of Patent: Jan. 5, 2021

(54) METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

(71) Applicant: LG Electronics Inc., Seoul (KR)

(72) Inventors: Sejin Oh, Seoul (KR); Jangwon Lee, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/304,540

(22) PCT Filed: May 19, 2017

(86) PCT No.: PCT/KR2017/005212
§ 371 (c)(1),
(2) Date: Nov. 26, 2018

(87) PCT Pub. No.: WO2017/204491
PCT Pub. Date: Nov. 30, 2017

(65) Prior Publication Data
US 2019/0174116 A1     Jun. 6, 2019

Related U.S. Application Data

(60) Provisional application No. 62/342,172, filed on May 26, 2016.

(51) Int. Cl.
*H04N 13/194*     (2018.01)
*H04N 13/00*     (2018.01)
(Continued)

(52) U.S. Cl.
CPC ....... *H04N 13/194* (2018.05); *H04N 5/23238* (2013.01); *H04N 5/2628* (2013.01);
(Continued)

(58) Field of Classification Search
CPC .. H04N 13/194; H04N 5/2628; H04N 21/816; H04N 19/46; H04N 5/23238;
(Continued)

(56) References Cited

U.S. PATENT DOCUMENTS

| | | | |
|---|---|---|---|
| 2008/0291217 A1 | 11/2008 | Vincent et al. | |
| 2011/0254915 A1 | 10/2011 | Vincent et al. | |

(Continued)

FOREIGN PATENT DOCUMENTS

| | | |
|---|---|---|
| JP | 2015023470 | 2/2015 |
| JP | 2015156523 | 8/2015 |

(Continued)

OTHER PUBLICATIONS

Samsung Electronics, "Proposed text for omnidirectional media application format," ISO/IEC JTC1/SC29/WG11 MPEG2016/ M37837, San Diego, CA, US, dated Feb. 2016, 13 pages.

(Continued)

Primary Examiner — Jared Walker
(74) Attorney, Agent, or Firm — Fish & Richardson P.C.

(57) ABSTRACT

A 360-degree video data processing method performed by an apparatus for transmitting a 360-degree video according to the present invention comprises the steps of: obtaining 360-degree video data captured by at least one camera; obtaining a 2D-based picture by processing the 360-degree video data; generating metadata associated with the 360-degree video data; encoding the picture; and performing processing for storing or transmitting the encoded picture and the metadata, wherein the metadata includes information on the central point of the picture, and the information on the central point of the picture indicates whether spherical coordinates in a spherical plane corresponding to the central point of the picture have a yaw value of 0 and a pitch value of 0, respectively.

17 Claims, 41 Drawing Sheets

(51) Int. Cl.
    *H04N 19/597*    (2014.01)
    *H04N 19/46*     (2014.01)
    *H04N 13/178*    (2018.01)
    *H04N 13/161*    (2018.01)
    *H04N 5/232*     (2006.01)
    *H04N 5/262*     (2006.01)
    *H04N 21/81*     (2011.01)

(52) U.S. Cl.
    CPC .......... *H04N 13/00* (2013.01); *H04N 13/161* (2018.05); *H04N 13/178* (2018.05); *H04N 19/46* (2014.11); *H04N 19/597* (2014.11); *H04N 21/816* (2013.01)

(58) Field of Classification Search
    CPC .... H04N 19/597; H04N 13/00; H04N 13/161; H04N 13/178; H04N 21/21805
    USPC .......................................................... 348/43
    See application file for complete search history.

(56) References Cited

U.S. PATENT DOCUMENTS

2014/0085295 A1    3/2014    Li
2017/0339391 A1*   11/2017   Zhou ................ H04N 21/21805
2018/0374192 A1*   12/2018   Kunkel ................ G06T 15/205

FOREIGN PATENT DOCUMENTS

KR    10-2009-0034694    4/2009
KR    10-2009-0123743    12/2009
KR      10-1212231       12/2012

OTHER PUBLICATIONS

Requirements, "Requirements and Use Cases for Omnidirectional Media Application Format," ISO/IEC JTC1/SC29/WG11 N15731, Geneva, Switzerland, dated Oct. 2015, 4 pages.

Matt Yu et al., "A Framework to Evaluate Omnidirectional Video Coding Schemes," 2015 IEEE International Symposium on Mixed and Augmented Reality, dated Sep. 1, 2015, 6 pages.

Extended European Search Report in European Application No. 17803010.2, dated Oct. 8, 2019, 13 pages.

* cited by examiner

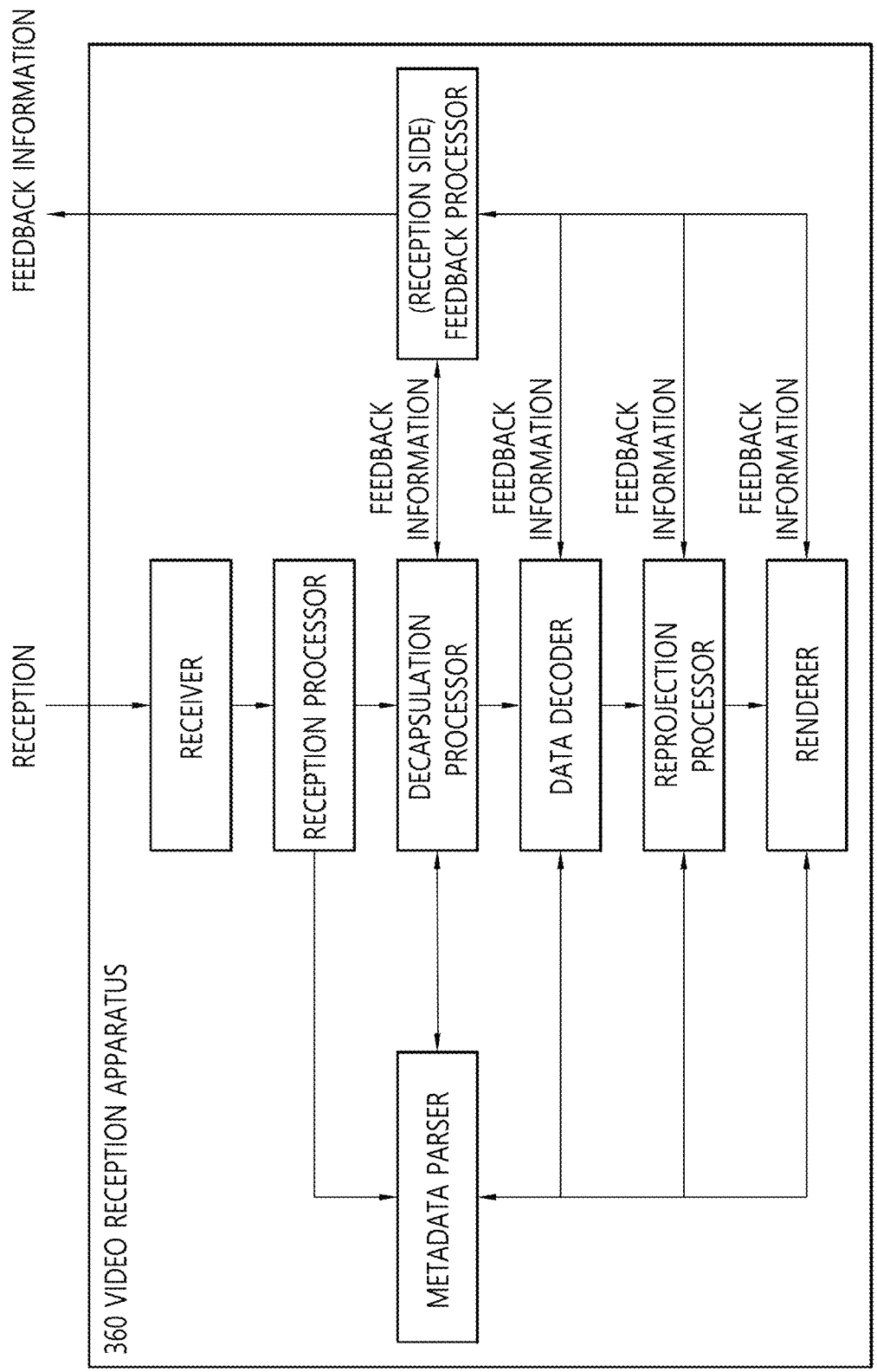

FIG. 6A

```
aligned(8) class OMVideoConfigurationBox extends FullBox('omvc', version=0, 0) {
    unsigned  int(8)  projection_schme;
    unsigned  int(1)  stitched_flag;
    unsigned  int(3)  stereo_mode;
    unsigned  int(1)         is_pitch_angle_less_180;
    unsigned  int(1)         is_yaw_angle_less_360;
    unsigned  int(1) is_not_centered;
    unsigned  int(1) is_yaw_only;

signed     int(8)  initial_view_yaw_degree;
    signed     int(8)  initial_view_pitch_degree;
    signed     int(8)  initial_view_roll_degree;

unsigned  int(5)         reserved = 0;
    unsigned  int(1) is_cropped_region;
    unsigned  int(1) content_fov_flag;
    unsigned  int(1) camera_info_flag;
    unsigned  int(1) region_info_flag;

if (stitched_flag == 1)  {
        string            stitching_type;
        unsigned int(8)       num_camera;
        for (int i=0; i< num-camera; i++) {
              signed int(16)     camera_center_pitch;
              signed int(16)     camera_center_yaw;
              signed int(16)     camera_center_roll;
        }
    } if(is_pitch_angle_less_180){
        signed int(8)   min_pitch;
        signed int(8   )      max_pitch;
    } if(is_yaw_angle_less_360){
        signed int(8)   min_yaw;
        signed int(8)         max_yaw;
    } if(is_not_centered == '1'){
        if(stitched_flag != '0')
        {
           signed int(8)      center_theta;
           signed int(8)      center_phi;
        }
    }
```

FIG. 6B

```
if((projection_scheme =='0')              || (projection_scheme =='3')) {
    unsigned int(16)    sphere_raidus;
} else if(projection_schme == '1'){   //cubic projection
    unsigned int(16)    cube_front_width;
    unsigned int(16)    cube_front_height;
    unsigned int(16)    cube_height;
} else if(projection_schme == '2') {  //cylindrical projection
    unsigned int(16)    cylinder_radius;
    unsigned int(16)    cylinder_height;
} else if(projection_schme == '4'){   //pyramid projection
    unsigned int(16)    pyramid_front_width;
    unsigned int(16)    pyramid_front_height;
    signed int(8)   pyramid_front_rotation;
    unsigned int(16)    pyramid_height;
} else if(projection_schme == '5'){   // panoramic projection
    unsigned int(16)    panorama_height;
} if(regions_info_flag == '1')   {
    RegionGroup region(projection_scheme);
} if(is_cropped_region == 1)   {
    unsigned int(16)    cr_region_left_top_x;
    unsigned int(16)    cr_region_left_top_y;
    unsigned int(16)    cr_region_width;
    unsigned int(16)    cr_region_height;
} if (content_fov_flag == 1) {
    unsigned int(16)    content_hfov;
    unsigned int(16)    content_vfov;
} if (camera_info_flag == 1)              {
   unsinged int(8) num_camera;
   for (int i=0; i< num_camera; i++) {
      IntrinsicCameraParametersBox  intrinsic_camera_params;
      ExtrinsicCameraParametersBox extrinsic_camera_params;
      signed int(16)        camera_center_pitch;
      signed int(16)        camera_center_yaw;
      signed int(16)        camera_center_roll;
   }
  }
}
```

FIG. 7
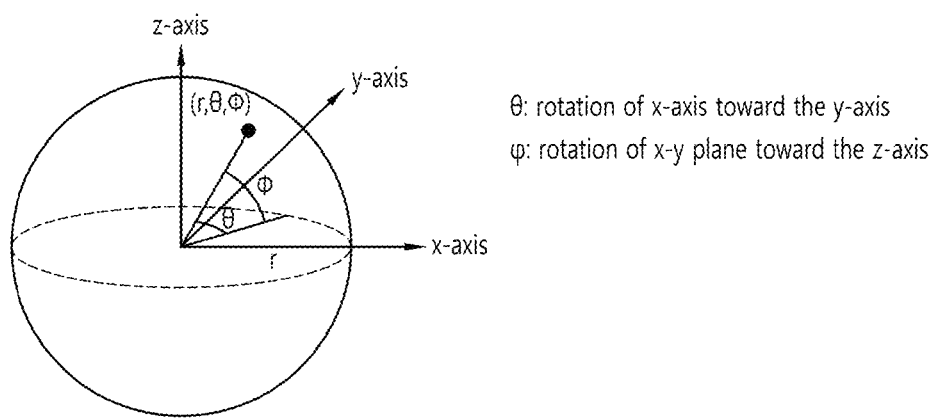
(a)
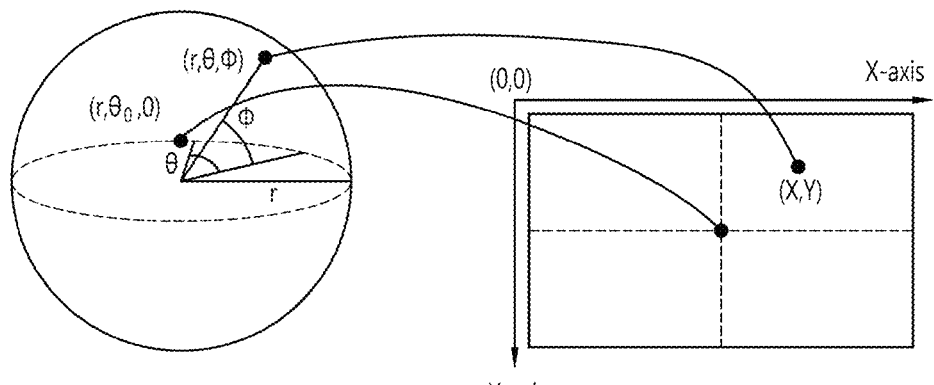
(b)

FIG. 8A
(a) 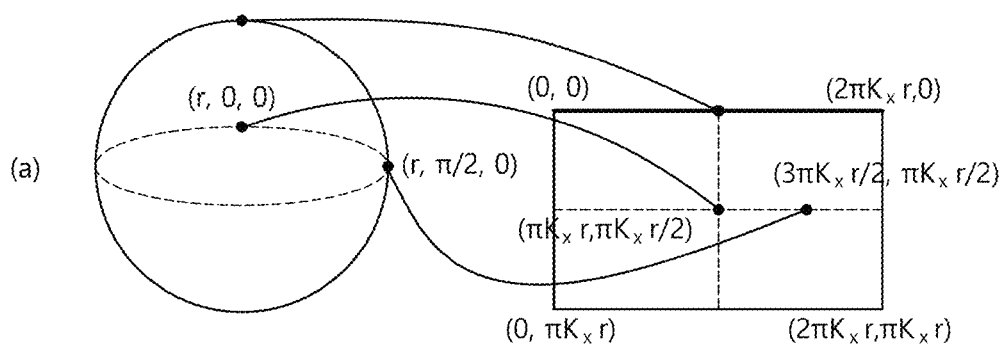
(b) 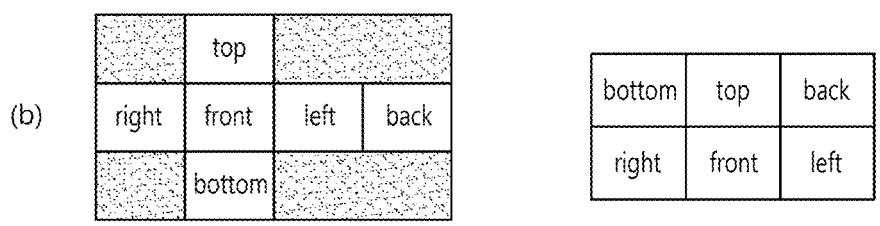
(c) 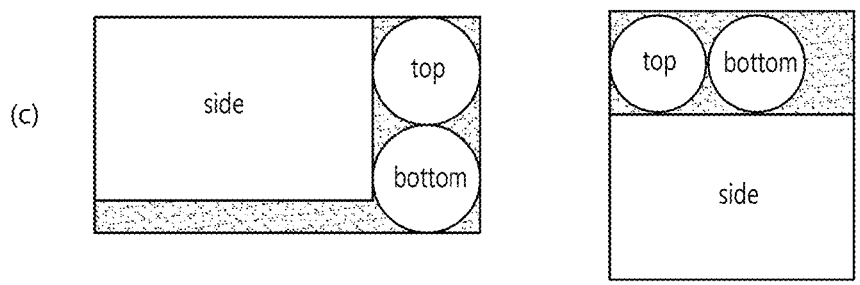
(d) 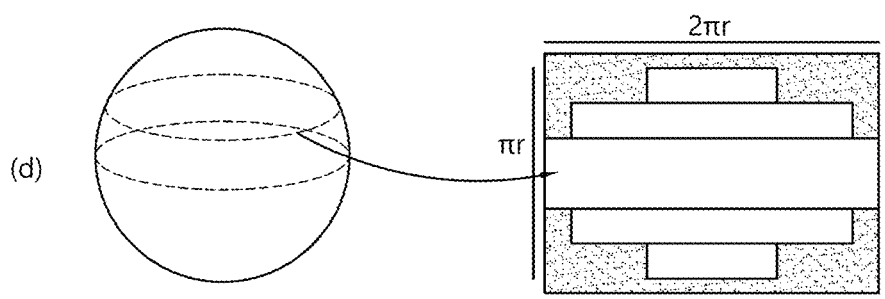

FIG. 11
(a) 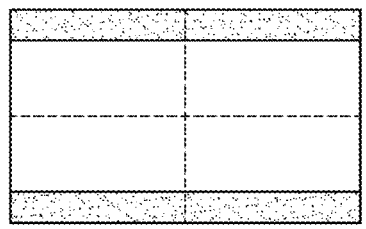
(b) 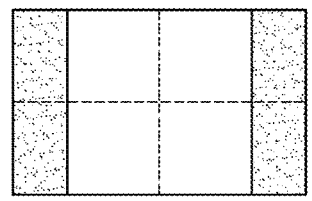

FIG. 13B
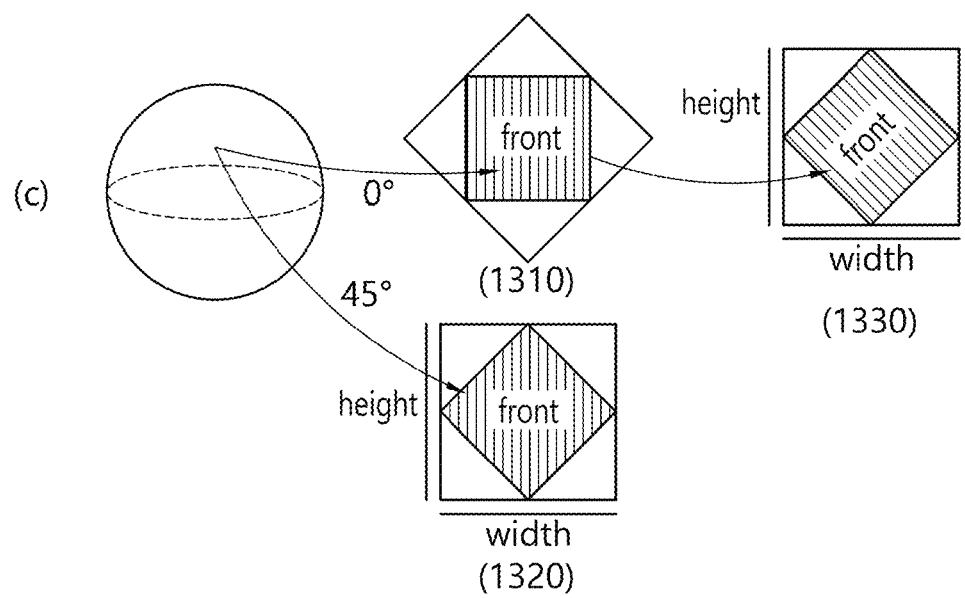
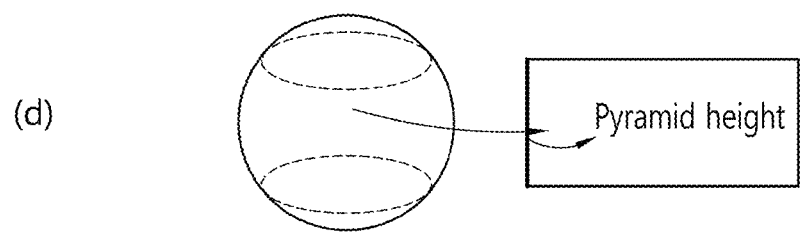

FIG. 15

```
class IntrinsicCameraParametersBox extends FullBox ('icam', version=0, flags) {
    unsigned int(6)    reserved=0;
    unsigned int(10)   ref_view_id;
    unsigned int(32)   prec_focal_length;
    unsigned int(3,2)  prec_principal_point;
    unsigned int(32)   prec_skew_factor;
    unsigned int(8)    exponent_focal_length_x;
    signed   int(64)   mantissa_focal_length_x;
    unsigned int(8)    exponent_focal_length_y;
    signed   int(64)   mantissa_focal_length_y;
    unsigned int(8)    exponent_principal_point_x;
    signed   int(64)   mantissa_principal_point_x;
    unsigned int(8)    exponent_principal_point_y;
    signed   int(64)   mantissa_principal_point_y;
    unsigned int(8)    exponent_skew_factor;
    signed   int(64)   mantissa_skew_factor;
}
```
~1500

```
class ExtrinsicCameraParametersBox extends FullBox ('ecam', version=0, flags) {
    unsigned int(6)    reserved=0;
    unsigned int(10)   ref_view_id;
    unsigned int(8)    prec_rotation_param;
    unsigned int(8)    prec_translation_param;
    for (j=1; j<=3; j++) { /* row */
        for (k=1; k<=3; k++) { /* column */
            unsigned int(8)  exponent_r[j][k];
            signed   int(64) mantissa_r[j][k];
        }
        unsigned int(8)  exponent_t[j];
        signed   int(64) mantissa_t[j];
    }
}
```
~1510

FIG. 16

```
class RegionGroup (unsigned int(8) projection_scehme) {
    unsigned int(8)      group_id;
    unsigned int(4)      reserved=0;
    unsigned int(4)      coding_dependency;
    unsigned int(8)      num_regions;
    for (j=0; j<= num_regions; j++) {
        unsigned int(8)              region_id;
        unsigned int(16)             horizontal_offset;
        unsigned int(16)             vertical_offset;
        unsigned int(16)             region_width;
        unsigned int(16)             region_height;
        unsigned int(6)reserved=0;
        unsigned int(1)              sub_region_flag;
        unsinged int (1)             region_rotation_flag;
        if(region_rotation_flag == '1'){
            unsigned int(7)    region_rotation_axis;
            signed int(8)      region_rotation;
        }
        if((projection_scheme =='0') || (projection_scheme =='3')) {
            signed int(8)              min_region_pitch ;
            signed int(8)              max_region_pitch ;
            signed int(8)              min_region_yaw ;
            signed int(8)              max_region_yaw ;
            signed int(8)              min_region_roll ;
            signed int(8)              max_region_roll ;
        }else if(projection_scheme =='1'){    //cubic projection
            unsinged int(8)            cube_face;
            if(sub_region_flag == '1'){
                unsigned int(8)                sub_region_horizontal_offset ;
                unsigned int(8)     sub_region_vertical_offset ;
                unsigned int(8)                sub_region_width ;
                unsigned int(8)                sub_region_height;
            }
        }else if(projection_scheme =='2'){    //cylindrical projection
            unsinged int(8)     cylinder_face;
            if(sub_region_flag == '1'){
                unsigned int(8)                sub_region_horizontal_offset ;
                unsigned int(8)     sub_region_vertical_offset ;
                unsigned int(8)                sub_region_width ;
                unsigned int(8)     sub_region_height;
                signed int(8)                  min_sub_region_yaw ;
                signed int(8)                  max_sub_region_yaw ;
            }
        } else if(projection_scheme =='4') {   //pyramid projection
            unsinged int(8)                pyramid_face;
            if(sub_region_flag == '1'){
                unsigned int(8)                sub_region_horizontal_offset ;
                unsigned int(8)     sub_region_vertical_offset ;
                unsigned int(8)                sub_region_width ;
                unsigned int(8)     sub_region_height;
            }
        } else if(projection_scheme == '5') { //panoramic projection
            signed int(8)                  min_region_yaw ;
            signed int(8)                  max_region_yaw ;
            signed int(8)                  min_region_height ;
            signed int(8)                  max_region_height ;
        } else if(projection_scheme == '6') {
            unsigned int(4)           reserved=0;
            unsigned int(10)          ref_view_id;
            signed int(16)            center_pitch;
            signed int(16)            center_yaw;
            signed int(16)            center_roll;
        }
    }
}
```

FIG. 17A

```
aligned(8) class TrackHeaderBox  extends FullBox('tkhd', version, flags){
  if (version==1) {
     unsigned int(64)   creation_time;
     unsigned int(64)   modification_time;
     unsigned int(32)   track_ID;
     const unsigned int(32)    reserved = 0;
     unsigned int(64)   duration;
  } else { // version==0
     unsigned int(32)   creation_time;
     unsigned int(32)   modification_time;
     unsigned int(32)   track_ID;
     const unsigned int(32)    reserved = 0;
     unsigned int(32)   duration;
  }
  const unsigned int(32)[2]    reserved = 0;
  template int(16)     layer = 0;
  template int(16)     alternate_group = 0;
  template int(16)     volume = {if track_is_audio 0x0100 else 0};
  const unsigned int(16)    reserved = 0;
  template int(32)[9]  matrix=
  {     0x00010000,0,0,0,0x00010000,0,0,0,0x40000000 };// unity matrix
  unsigned int(32)     width;
  unsigned int(32)     height;
  unsigned int(1)      omv_flag;
  unsigned int(7)      reserved=0;
  if(omv_flag == 1){
     OMVideoConfigurationBox      omv_config
  }
}
```
~1700

```
aligned(8) class VideoMediaHeaderBox extends FullBox('vmhd', version = 0, 1) {
template unsigned int(16)    graphicsmode = 0;
//       copy, see below
   template unsigned int(16)[3]     opcolor = (0, 0, 0);
   unsigned int(1)      omv_flag;
   unsigned int(7)      reserved=0;
   if(omv_flag == 1){
      OMVideoConfigurationBox     omv_config
   }
}
```
~1705

FIG. 17B

```
aligned(8) class TrackExtendsBox extends FullBox('trex', 0, 0){
   unsigned int(32)      track_ID;
   unsigned int(32)      default_sample_description_index;
   unsigned int(32)      default_sample_duration;
   unsigned int(32)      default_sample_size;
   unsigned int(32)      default_sample_flags;
   unsigned int(1)       default_sample_omv_flag;
   unsigned int(7)       reserved=0;
   if(default_sample_hdr_flag == 1){
      OMVideoConfigurationBox      default_sample_omv_config;
   }
}
```
~1710

```
aligned(8) class TrackFragmentHeaderBox extends FullBox('tfhd', 0, tf_flags){
    unsigned int(32)     track_ID;
   unsigned int(1)       omv_flag;
   unsigned int(7)       reserved=0;
   if(omv_flag == 1){
      OMVideoConfigurationBox      omv_config;
   }
   //     all the following are optional fields
   unsigned int(64)      base_data_offset;
   unsigned int(32)      sample_description_index;
   unsigned int(32)      default_sample_duration;
   unsigned int(32)      default_sample_size;
   unsigned int(32)      default_sample_flags;
}
```
~1715

```
aligned(8) class TrackFragmentHeaderBox extends FullBox('tfhd', 0, tf_flags){
    unsigned int(32)     track_ID;
   //     all the following are optional fields
   unsigned int(64)      base_data_offset;
   unsigned int(32)      sample_description_index;
   unsigned int(32)      default_sample_duration;
   unsigned int(32)      default_sample_size;
   unsigned int(32)      default_sample_flags;
   OMVideoConfigurationBox      default_sample_omv_config;
}
```
~1720

```
aligned(8) class TrackRunBox extends FullBox('trun', version, tr_flags) {
   unsigned int(32)     sample_count;
   unsigned int(1)      omv_flag;
   unsigned int(7)      reserved=0;
   if(omv_flag == 1){
      OMVideoConfigurationBox      omv_config;
   }
   //    the following are optional fields
    signed int(32)                data_offset;
    unsigned int(32)     first_sample_flags;
   //    all fields in the following array are optional
    {
       unsigned int(32)   sample_duration;
       unsigned int(32)   sample_size;
       unsigned int(32)   sample_flags;
       if (version == 0)
{
       unsigned int(32)       sample_composition_time_offset;
    }else {
       signed int(32)    sample_composition_time_offset;
    }
   }[ sample_count ]
}
```

```
aligned(8) class TrackFragmentHeaderBox extends FullBox('trun', version, tr_flags) {
   unsigned int(32)     sample_count;
// the following are optional fields
   signed int(32)                data_offset;
   unsigned int(32)     first_sample_flags;
   OMVideoConfigurationBox      omv_config;
// all fields in the following array are optional
   {
      unsigned int(32)   sample_duration;
      unsigned int(32)   sample_size;
      unsigned int(32)   sample_flags;
      if (version == 0)
{
      unsigned int(32)       sample_composition_time_offset;
   }else {
      signed int(32)    sample_composition_time_offset;
   }
  }[ sample_count ]
}
```

```
aligned(8) class TrackFragmentHeaderBox extends FullBox('trun', version, tr_flags) {
    unsigned int(32)    sample_count;
    // the following are optional fields
    signed int(32)                      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if (version == 0)
        {
            unsigned int(32)    sample_composition_time_offset;
        }else {
            signed int(32)      sample_composition_time_offset;
        }
        OMVideoConfigurationBox    sample_omv_config;
    }[ sample_count ]
}
```
—1735

```
class VisualSampleGroupEntry (unsigned int(32) grouping_type) extends SampleGroupEntry (grouping_type)
    unsigned int(1)     omv_flag;
    unsigned int(7)     reserved=0;
    if(omv_flag == 1){
        OMVideoConfigurationBox    omv_config;
    }
}
```
—1740

FIG. 17E

```
class VisualSampleEntry(codingname) extends SampleEntry (codingname){
    unsigned int(16) pre_defined = 0;
    const unsigned int(16) reserved = 0;
    unsigned int(32)[3]  pre_defined = 0;
    unsigned int(16)     width;
    unsigned int(16)     height;
    template unsigned int(32)   horizresolution = 0x00480000;      // 72 dpi
    template unsigned int(32)   vertresolution  = 0x00480000;      // 72 dpi
    const unsigned int(32)       reserved = 0;
    template unsigned int(16)   frame_count = 1;
    string[32]          compressorname;
    template unsigned int(16)   depth = 0x0018;
    int(16)         pre_defined = -1;
// other boxes from derived specifications
    CleanApertureBox    clap;// optional
    PixelAspectRatioBoxpasp;// optional
    unsigned int(1)        omv_flag;
    unsigned int(7)        reserved=0;
    if(omv_flag == 1){
        OMVideoConfigurationBox       omv_config;
    }
}
```
~1745

```
class HEVCSampleEntry() extends VisualSampleEntry ('hvc1' or 'hev1'){
    HEVCConfigurationBox config;
    OMVideoConfigurationBox        omv_config;//optional
    MPEG4BitRateBox (); // optional
    MPEG4ExtensionDescriptorsBox (); // optional
    extra_boxes boxes; // optional
}
```
~1750

```
class HEVCConfigurationBox extends Box('hvcC') {
    HEVCDecoderConfigurationRecord() HEVCConfig;
    OMVideoConfigurationBox        omv_config;//optional
}
```
~1755

FIG. 17F

```
aligned(8) class HEVCDecoderConfigurationRecord {
  unsigned int(8) configurationVersion = 1;
  unsigned int(2) general_profile_space;
  unsigned int(1) general_tier_flag;
  unsigned int(5) general_profile_idc;
  unsigned int(32) general_profile_compatibility_flags;
  unsigned int(48) general_constraint_indicator_flags;
  unsigned int(8) general_level_idc;
  bit(3) reserved = '111'b;
  bit(1)           omv_flag;
  unsigned int(12) min_spatial_segmentation_idc;
  bit(6) reserved = '111111'b;
  unsigned int(2) parallelismType;
  bit(6) reserved = '111111'b;
  unsigned int(2) chromaFormat;
  bit(5) reserved = '11111'b;
  unsigned int(3) bitDepthLumaMinus8;
  bit(5) reserved = '11111'b;
  unsigned int(3) bitDepthChromaMinus8;
  bit(16) avgFrameRate;
  bit(2) constantFrameRate;
  bit(3) numTemporalLayers;
  bit(1) temporalIdNested;
  unsigned int(2) lengthSizeMinusOne;
  unsigned int(8) numOfArrays;
  for (j=0; j < numOfArrays; j++) {
    bit(1) array_completeness;
    unsigned int(1) reserved = 0;
    unsigned int(6) NAL_unit_type;
    unsigned int(16) numNalus;
    for (i=0; i< numNalus; i++) {
      unsigned int(16) nalUnitLength;
      bit(8*nalUnitLength) nalUnit;
    }
  }
  if(omv_flag ==1){
        OMVideoConfigurationBox    omv_config;//optional
  }
}
```
~1760

FIG. 18A

```
aligned(8) class VrVideoBox extends extends FullBox('vrvd', version = 0, 0)
{
        template unsigned int(28) reserved = 0;
        unsigned int(4) vr_mapping_type;
        OMVideoConfigurationBox      omv_config;
        Box[] any_box; // optional
}
```
— 1800

```
aligned(8) class OmnidirectionalMediaMetadataSampleEntry extends
MetadataSampleEntry ('omtm'){
        OMVideoConfigurationBox      omv_config;
}
```
— 1810

```
class  OMVInformationSEIBox extends Box('omsb ', size)
{
   unsigned int(8*size-64)omvinfosei;
}
```
— 1820

```
class VisualSampleEntry(codingname) extends SampleEntry
   (codingname){
   unsigned int(16) pre_defined = 0;
   const unsigned int(16) reserved = 0;
   unsigned int(32)[3]      pre_defined = 0;
   unsigned int(16) width;
   unsigned int(16) height;
   template unsigned int(32)     horizresolution = 0x00480000;  // 72 dpi
   template unsigned int(32)     vertresolution  = 0x00480000;  // 72 dpi
   const unsigned int(32)  reserved = 0;
   template unsigned int(16)     frame_count = 1;
   string[32]  compressorname;
   template unsigned int(16)     depth = 0x0018;
   int(16)     pre_defined = -1;
//       other boxes from derived specifications
   CleanApertureBox      clap;// optional
   PixelAspectRatioBox    pasp;// optional
   OMVInformationSEIBox            omv_sei; // optional
}
```
— 1830

FIG. 18B

```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    OMVInformationSEIBox    omv_sei; // optional
}
```
— 1840

```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    OMVInformationSEIBox omv_sei; // optional
    extra_boxes boxes; // optional
}
```
— 1850

```
aligned(8) class TrackReferenceBox extends Box('tref') {
}
aligned(8) class TrackReferenceTypeBox (unsigned int(32) reference_type) extends Box(reference_type) {
    unsigned int(32) track_IDs[];
}
```
— 1860

FIG. 20A

| | Descriptor |
|---|---|
| colour_remapping_info( payloadSize ) { | |
|   projection_scheme | u(8) |
|   if((projection_scheme =='0') || (projection_scheme =='3')) { | |
|     sphere_radius | u(16) |
|   } else if(projection_schme == '1'){   //cubic projection | |
|     cube_front_width | u(16) |
|     cube_front_height | u(16) |
|     cube_height | u(16) |
|   } else if(projection_schme == '2') {   //cylindrical projection | |
|     cylinder_radius | u(16) |
|     cylinder_height | u(16) |
|   } else if(projection_schme == '4'){ | |
|     pyramid_front_width | u(16) |
|     pyramid_front_height | u(16) |
|     pyramid_front_rotation | u(16) |
|     pyramid_height | u(16) |
|   } else if(projection_schme == '5'){ | |
|     panorama_height | u(16) |
|   } | |
|   stitched_flag | u(1) |
|   if(stitched_flag) { | |
|     num_camera | u(8) |
|     for(int I =0; i< num_camera; i++) { | |
|       camera_center_pitch | u(16) |
|       camera_center_yaw | u(16) |
|       camera_center_roll | u(16) |
|     } | |
|     stitching_type | |
|   } | |
|   stereo_mode | |
|   is_pitch_angle_less_180 | |
|   if(is_pitch_angle_less_180) { | |
|     min_pitch | u(16) |
|     max_pitch | u(16) |
|   } | |
|   is_yaw_angle_less_360 | u(1) |
|   if(is_yaw_angle_less_360) { | |
|     min_yaw | u(16) |
|     max_yaw | u(16) |
|   } | |
|   is_not_centerd | u(1) |
|   if(is_not_centered) { | |
|     center_pitch | u(16) |
|     center_yaw | u(16) |
|   } | |

FIG. 20B

| | |
|---|---|
| is_yaw_only | u(1) |
| initial_view_yaw_degree | u(16) |
| initial_view_pitch_degree | u(16) |
| initial_view_roll_degree | u(16) |
| is_cropped_region | u(1) |
| if(is_cropped_region){ | |
|     cr_region_left_top_x | u(16) |
|     cr_region_left_top_y | u(16) |
|     cr_region_width | u(16) |
|     cr_region_height | u(16) |
| } | |
| content_fov_flag | u(1) |
| if(content_fov_flag){ | |
|     content_hfov | u(16) |
|     content_vfov | u(16) |
| } | |
| camera_info_flag | u(1) |
| if(camera_info_flag) { | |
|     num_camera | u(8) |
|     for(int I =0; i< num_camera; i++) { | |
|         camera_center_pitch | u(16) |
|         camera_center_yaw | u(16) |
|         camera_center_roll | u(16) |
|     } | |
| } | |
| region_info_flag | u(1) |
| if(region_info_flag) { | |
|     num_region | u(8) |
| } | |

FIG. 21A

| region_group ( payloadSize ) { | Descriptor |
|---|---|
| group_id | u(8) |
| coding_dependency | u(4) |
| project_scheme | u(8) |
| num_regions | u(8) |
| for(int I =0; i< num_regions; i++) { | |
|     region_id | u(16) |
|     horizontal_offset | u(16) |
|     verical_offset | u(16) |
|     region_width | u(16) |
|     region_height | u(16) |
|     sub_region_flag | u(1) |
|     region_rotation_flag | u(1) |
|     if(region_rotation_flag){ | |
|         region_rotation_axis | u(8) |
|         region_rotation | u(16) |
|     } | |
|     if((projection_scheme =='0') || (projection_scheme =='3')) { | |
|         min_region_pitch | u(16) |
|         max_region_pitch | u(16) |
|         min_region_yaw | u(16) |
|         max_region_yaw | u(16) |
|         min_region_roll | u(16) |
|         max_region_roll | u(16) |
|     } else if (projection_scheme == '1'){ | |
|         cube_face | u(8) |
|         if(sub_region_flag){ | u(16) |
|             sub_region_horizontal_offset | u(16) |
|             sub_region_verical_offset | u(16) |
|             sub_region_width | u(16) |
|             sub_region_height | u(16) |
|         } | |
|     } else if (projection_scheme == '2'){ | |
|         cylinder_face | u(8) |
|         if(sub_region_flag){ | u(16) |
|             sub_region_horizontal_offset | u(16) |
|             sub_region_verical_offset | u(16) |
|             sub_region_width | u(16) |
|             sub_region_height | u(16) |
|             min_sub_region_yaw | u(16) |
|             max_sub_region_yaw | u(16) |
|         } | |

FIG. 21B

| | |
|---|---|
| } else if (projection_scheme == '4'){ | |
| pyramid_face | u(8) |
| if(sub_region_flag){ | u(16) |
| sub_region_horizontal_offset | u(16) |
| sub_region_verical_offset | u(16) |
| sub_region_width | u(16) |
| sub_region_height | u(16) |
| } | |
| } else if(projection_scheme == '5') { | |
| min_region_yaw | u(16) |
| max_region_yaw | u(16) |
| min_region_height | u(16) |
| max_region_height | u(16) |
| } else if (projection_scheme == '6'){ | |
| ref_view_id | u(16) |
| camera_center_pitch | u(16) |
| camera_center_yaw | u(16) |
| camera_center_roll | u(16) |
| } | |
| } | |
| } | |

FIG. 23A

| | | |
|---|---|---|
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. or URL. When a URL is used, it can also contain a month-date in the form mmyyyy; |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— 2300

| Scheme Identifier (@schemeIdUri) | Informative description |
|---|---|
| urn:mpeg:dash:vr:201x | Scheme identifier for omnidirectional video Configuration |

| @value | Use | Description |
|---|---|---|
| Projection_scheme | M | This can indicate a scheme applied when a 360 video image (omnidirectional video) acquired from a camera is mapped to an image. An embodiment is as follows.<br><br>0: equirectangular projection, 1: cubic projection, 2 : cylindrical projection, 3: tile-based projection, 4: pyramid projection, 5:panoramic projection,<br>6: images acquired by one or more cameras are mapped to a specific region of a 2D image without image stitching. |
| stitched_flag | OD (default:true) | This is a flag indicating whether images acquired through one or more camera sensors have been stitched.<br>When the Projection_scheme is '6', the stitched_flag has a false value. |
| stereo_mode | OD (default : mono) | This can indicate stereoscopic 3D layout supported by the corresponding video. An embodiment is as follows. This can also indicate 2D or 3D.<br>0: mono, 1: left-right, 2:top-bottom |
| is_pitch_angle_less_180 | OD (default:true) | This can indicate whether a difference between a minimum value and a maximum value of a pitch supported by the corresponding video when 360 video is projected and rendered on 3D space is less than 180°. |
| is_yaw_angle_less_360 | OD (default:true) | This can indicate whether a difference between a minimum value and a maximum value of a yaw supported by the corresponding video when 360 video is projected and rendered on 3D space is less than 360°. |
| is_yaw_only | OD (default: false) | This is a flag indicating that a user can experience a 360 video only through horizontal rotation when the user experiences the 360 video based on a VR display.<br>(Flag indicating if the motion is restricted to yaw only). |

| @value | Use | Description | | |
|---|---|---|---|---|
| is_not_centered | OD (default: false) | This can indicate that the center pixel of a 2D image is not mapped to a point corresponding to θ=0 and φ=0 (which may be a point corresponding to pitch=0 and yaw=0) on the spherical surface or indicate the following information according to projection_scheme values. | | |
| | | Projection scheme Value | Meaning | |
| | | 0, 3, 5 | This can indicate whether the center pixel of a 2D image is mapped to a point corresponding to θ=0 and φ=0 (which may be a point corresponding to pitch=0 and yaw=0) on the spherical surface. When is_not_centered value is "0", it can represent that the center pixel of the image is mapped to the point corresponding to θ=0 and φ=0 on the spherical surface. | |
| | | 1 | This can indicate whether the center pixel of a region representing a front in a 2D image is mapped to a point corresponding to θ=0 and φ=0 (which may be a point corresponding to pitch=0 and yaw=0) on the spherical surface. When is_not_centered value is "0", it can represent that the center pixel of the image is mapped to the point corresponding to θ=0 and φ=0 on the spherical surface. | |
| | | 2 | This can indicate whether the center pixel of a region representing a side in a 2D image is mapped to a point corresponding to θ=0 and φ=0 (which may be a point corresponding to pitch=0 and yaw=0) on the spherical surface. When is_not_centered value is "0", it can represent that the center pixel of the image is mapped to the point corresponding to θ=0 and φ=0 on the spherical surface. | |
| | | 4 | This can indicate whether the center pixel of a region representing a front in a 2D image is mapped to a point corresponding to θ=0 and φ=0 (which may be a point corresponding to pitch=0 and yaw=0) on the spherical surface. When is_not_centered value is "0", it can represent that the center pixel of the image is mapped to the point corresponding to θ=0 and φ=0 on the spherical surface. | |

FIG. 23D

| | | |
|---|---|---|
| initial_view_yaw | OD (default: 0) | This can indicate a yaw value for the center point of an initial view of a user when the corresponding 360 video is provided, that is, rotation direction and angle based on the yaw axis. |
| initial_view_pitch | OD (default: 0) | This can indicate a pitch value for the center point of an initial view of a user when the corresponding 360 video is provided, that is, rotation direction and angle based on the pitch axis. |
| initial_view_roll | OD (default: 0) | This can indicate a roll value for the center point of an initial view of a user when the corresponding 360 video is provided, that is, rotation direction and angle based on the roll axis. |
| Num_camera | O | This can indicate the number of cameras used to capture the 360 video. |
| center_theta | | <table><tr><th>Projection scheme Value</th><th>Meaning</th></tr><tr><td>0, 3, 5</td><td>θ (theta) on spherical coordinates of a capture space mapped to the center pixel of 2D image or a yaw value during rending</td></tr><tr><td>1</td><td>θ (theta) on the spherical coordinates of the capture space mapped to the center pixel of a region representing a front in a 2D image or a yaw value during rending</td></tr><tr><td>2</td><td>θ (theta) on the spherical coordinates of the capture space mapped to the center pixel of a region representing a side in a 2D image or a yaw value during rending</td></tr><tr><td>4</td><td>θ (theta) on the spherical coordinates of the capture space mapped to the center pixel of a region representing a front in a 2D image or a yaw value during rending</td></tr></table> |

FIG. 23E

| @value | Use | Description | | |
|---|---|---|---|---|
| center_phi | 0 | This can indicate the following information according to projection_scheme values. | | |
| | | Projection scheme Value | Meaning | |
| | | 0, 3, 5 | A phi or pitch value on the spherical coordinates during capture which is mapped to the center pixel of a 2D image | |
| | | 1 | A phi or pitch value on the spherical coordinates during capture which is mapped to the center pixel of a region representing a front in a 2D image | |
| | | 2 | A phi or pitch value on the spherical coordinates during capture which is mapped to the center pixel of a region representing a side in a 2D image | |
| | | 4 | A phi or pitch value on the spherical coordinates during capture which is mapped to the center pixel of a region representing a front in a 2D image | |

| | | |
|---|---|---|
| content_fov | O | Field of view (FOV) of content intended when the corresponding 360 video is created. |
| cropped_region_x | O | This can indicate the x coordinate of a region in a video frame to be displayed on a screen or the left top of an active video area in the video frame. |
| cropped_region_y | O | This can indicate the y coordinate of a region in a video frame to be displayed on a screen or the left top of an active video area in the video frame. |
| cropped_region_width | O | This can indicate width pixels of a region in a video frame to be displayed on a screen or the left top of an active video area in the video frame. |
| cropped_region_height | O | This can indicate height pixels of a region in a video frame to be displayed on a screen or the left top of an active video area in the video frame. |
| min_pitch | OD (default: -90) | A minimum value of a pitch (rotation direction and angle on the pitch axis) supported by a 360 video included in a 2D image frame when the 360 video is reprojected and rendered on a 3D space. This can be a minimum value of phi in spherical coordinates of capture space. |
| max_pitch | OD (default: 90) | A maximum value of a pitch supported by a 360 video included in a 2D image frame when the 360 video is reprojected and rendered on a 3D space. This can be a maximum value of phi in spherical coordinates of capture space. |
| min_yaw | OD (default: -180) | A minimum value of a yaw (rotation direction and angle on the yaw axis) supported by a 360 video included in a 2D image frame when the 360 video is reprojected and rendered on a 3D space. This can be a minimum value of theta in spherical coordinates of capture space. |
| max_yaw | OD (default: 180) | A maximum value of a yaw (rotation direction and angle on the yaw axis) supported by a 360 video included in a 2D image frame when the 360 video is reprojected and rendered on a 3D space. This can be a maximum value of theta in spherical coordinates of capture space. |
| Legend: M=Mandatory, O=Optional | | |

~2320

METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

CROSS-REFERENCE TO RELATED APPLICATIONS

This application is a National Stage application under 35 U.S.C. § 371 of International Application No. PCT/KR2017/005212, filed on May 19, 2017, which claims the benefit of U.S. Provisional Application No. 62/342,172, filed on May 26, 2016. The disclosures of the prior applications are incorporated by reference in their entirety.

BACKGROUND OF THE INVENTION

Field of the Invention

The present invention relates to a 360-degree video and, more specifically, to methods and apparatus for transmitting and receiving a 360-degree video.

Related Art

Virtual reality (VR) systems allow users to feel as if they are in electronically projected environments. Systems for providing VR can be improved in order to provide images with higher picture quality and spatial sounds. VR systems allow users to interactively consume VR content.

SUMMARY OF THE INVENTION

An object of the present invention is to provide a method and apparatus for improving VR video data transmission efficiency for providing a VR system.

Another object of the present invention is to provide a method and apparatus for transmitting VR video data and metadata with respect to VR video data.

According to an embodiment of the present invention, a 360-degree video data processing method performed by a 360-degree video transmission apparatus is provided. The method includes: acquiring 360-degree video data captured by at least one camera; processing the 360-degree video data to acquire 2D (two-dimensional) based picture; generating metadata about the 360-degree video data; encoding the picture; and performing processing for storage or transmission of the encoded picture and the metadata, wherein the metadata includes information about the center point of the picture, wherein the information about the center point of the picture represents whether a yaw value and a pitch value of spherical coordinates of a spherical surface corresponding to the center point of the picture are 0.

According to another embodiment of the present invention, a 360-degree video transmission apparatus for processing 360-degree video data is provided. The 360-degree video transmission apparatus includes: a data input unit configured to acquire 360-degree video data captured by at least one camera; a projection processor configured to process the 360-degree video data to acquire 2D (two-dimensional) based picture; a metadata processor configured to generate metadata about the 360-degree video data; an encoder configured to encode the picture; and a transmission processor configured to perform processing for storage or transmission of the encoded picture and the metadata, wherein the metadata includes information about the center point of the picture, wherein the information about the center point of the picture represents whether a yaw value and a pitch value of spherical coordinates of a spherical surface corresponding to the center point of the picture are 0.

According to another embodiment of the present invention, a 360-degree video data processing method performed by a 360-degree video reception apparatus is provided. The method includes: receiving a signal including information about a 2D based picture with respect to 360-degree video data and metadata about the 360-degree video data; processing the signal to acquire the information about the picture and the metadata; decoding the picture based on the information about the picture; and processing the decoded picture based on the metadata to render the picture on a 3D space, wherein the metadata includes information about the center point of the picture, wherein the information about the center point of the picture represents whether a yaw value and a pitch value of spherical coordinates of a spherical surface corresponding to the center point of the picture are 0.

According to another embodiment of the present invention, a 360-degree video reception apparatus for processing 360-degree video data is provided. The 360-degree video reception apparatus includes: a receiver configured to receive a signal including information about a 2D based picture with respect to 360-degree video data and metadata about the 360-degree video data; a reception processor configured to process the signal to acquire the information about the picture and the metadata; a data decoder configured to decode the picture based on the information about the picture; and a renderer configured to process the decoded picture based on the metadata to render the picture on a 3D space, wherein the metadata includes information about the center point of the picture, wherein the information about the center point of the picture represents whether a yaw value and a pitch value of spherical coordinates of a spherical surface corresponding to the center point of the picture are 0.

According to the present invention, it is possible to efficiently transmit 360-degree content in an environment supporting next-generation hybrid broadcast using terrestrial broadcast networks and the Internet.

According to the present invention, it is possible to propose a method for providing interactive experience in 360-degree content consumption of users.

According to the present invention, it is possible to propose a signaling method for correctly reflecting the intention of a 360-degree content provider in 360-degree content consumption of users.

According to the present invention, it is possible to propose a method for efficiently increasing transmission capacity and forwarding necessary information in 360-degree content transmission.

According to the present invention, it is possible to efficiently store and transmit signaling information about 360-degree video data through an ISO (International Organization for Standardization) based media file format such as ISOBMFF (ISO base media file format).

According to the present invention, it is possible to transmit signaling information about 360-degree video data through HTTP (HyperText Transfer Protocol) based adaptive streaming such as DASH (Dynamic Adaptive Streaming over HTTP).

According to the present invention, it is possible to store and transmit signaling information about 360-degree video data through an SEI (Supplemental Enhancement Information) message or VUI (Video Usability Information) to thereby improve overall transmission efficiency.

BRIEF DESCRIPTION OF DRAWINGS

FIG. 5 is a view schematically illustrating a configuration of a 360 video reception apparatus to which the present invention is applicable.

FIGS. 6a and 6b are views illustrating 360 video related metadata according to an embodiment of the present invention.

FIG. 7 illustrates spherical coordinates.

FIGS. 8a and 8b illustrate projection schemes according to the present invention.

FIG. 11 illustrates examples of projection regions on 2D images and 3D models according to 360-degree video support ranges.

FIGS. 13a and 13b illustrate examples of detailed information about respective projection schemes.

FIG. 15 illustrates IntrinsicCameraParametersBox class and ExtrinsicCameraParametersBox class according to an embodiment of the present invention.

FIG. 16 illustrates a RegionGroup class according to an embodiment of the present invention.

FIGS. 17a to 17f illustrate examples in which 360 video related metadata defined by OMVideoConfigurationBox class is signaled in respective boxes.

FIGS. 18a and 18b illustrate examples in which 360 video related metadata defined by OMVideoConfigurationBox class is signaled in respective boxes.

FIGS. 20a and 20b illustrate an example in which fields (attributes) in OMVideoConfigurationBox are signaled through an SEI message of an AVC NAL unit or an HEVC NAL unit.

FIGS. 21a and 21b illustrate an example of a region group SEI message.

FIGS. 23a to 23f illustrate an example of 360 video related metadata described in a DASH based descriptor format.

DESCRIPTION OF EXEMPLARY EMBODIMENTS

Figure 1:
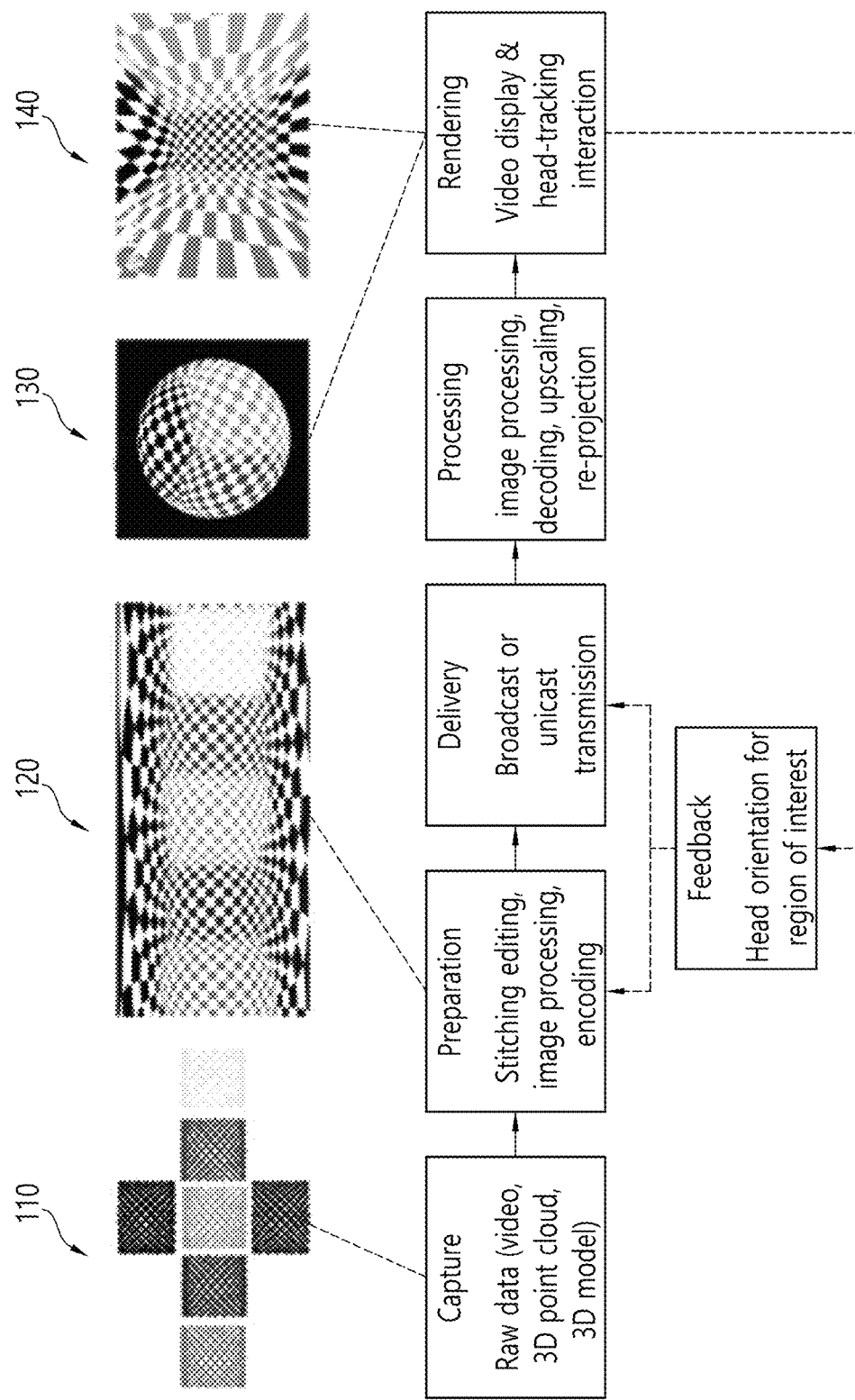
FIG. 1 is a view illustrating overall architecture for providing a 360 video according to the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present invention.

The present invention proposes a method of providing 360-degree content in order to provide virtual reality (VR) to users. VR may refer to technology for replicating actual or virtual environments or those environments. VR artificially provides sensory experience to users and thus users can experience electronically projected environments.

360 content refers to content for realizing and providing VR and may include a 360 video and/or 360 audio. The 360 video may refer to video or image content which is necessary to provide VR and is captured or reproduced omnidirectionally (360 degrees). Hereinafter, the 360 video may refer to 360-degree video. A 360 video may refer to a video or an image represented on 3D spaces in various forms according to 3D models. For example, a 360 video can be represented on a spherical surface. The 360 audio is audio content for providing VR and may refer to spatial audio content whose audio generation source can be recognized to be located in a specific 3D space. 360 content may be generated, processed and transmitted to users and users can consume VR experiences using the 360 content.

Particularly, the present invention proposes a method for effectively providing a 360 video. To provide a 360 video, a 360 video may be captured through one or more cameras. The captured 360 video may be transmitted through series of processes and a reception side may process the transmitted 360 video into the original 360 video and render the 360 video. In this manner the 360 video can be provided to a user.

Specifically, processes for providing a 360 video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360 video according to an embodiment. For example, it is possible to increase the resolution of regions corresponding to relatively more important regions in a 360 video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360 video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360 video which is currently viewed by the user, that is, viewport information, can be calculated.

The viewport information may be information about a region in a 360 video which is currently viewed by a user. Gaze analysis may be performed through the viewpoint information to check how the user consumes the 360 video, which region of the 360 video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360 video with respect to a region currently viewed by the user may be preferentially decoded and rendered using the head orientation information and/or the viewport information.

Here, a viewport or a viewport region may refer to a region in a 360 video being viewed by a user. A viewpoint is a point in a 360 video being viewed by a user and may refer to a center point of a viewport region. That is, a viewport is a region having a viewpoint at the center thereof, and the size and the shape of the region can be determined by an FOV which will be described later.

In the above-described overall architecture for providing a 360 video, image/video data which is subjected to the capture/projection/encoding/transmission/decoding/re-projection/rendering processes may be referred to as 360 video data. The term "360 video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
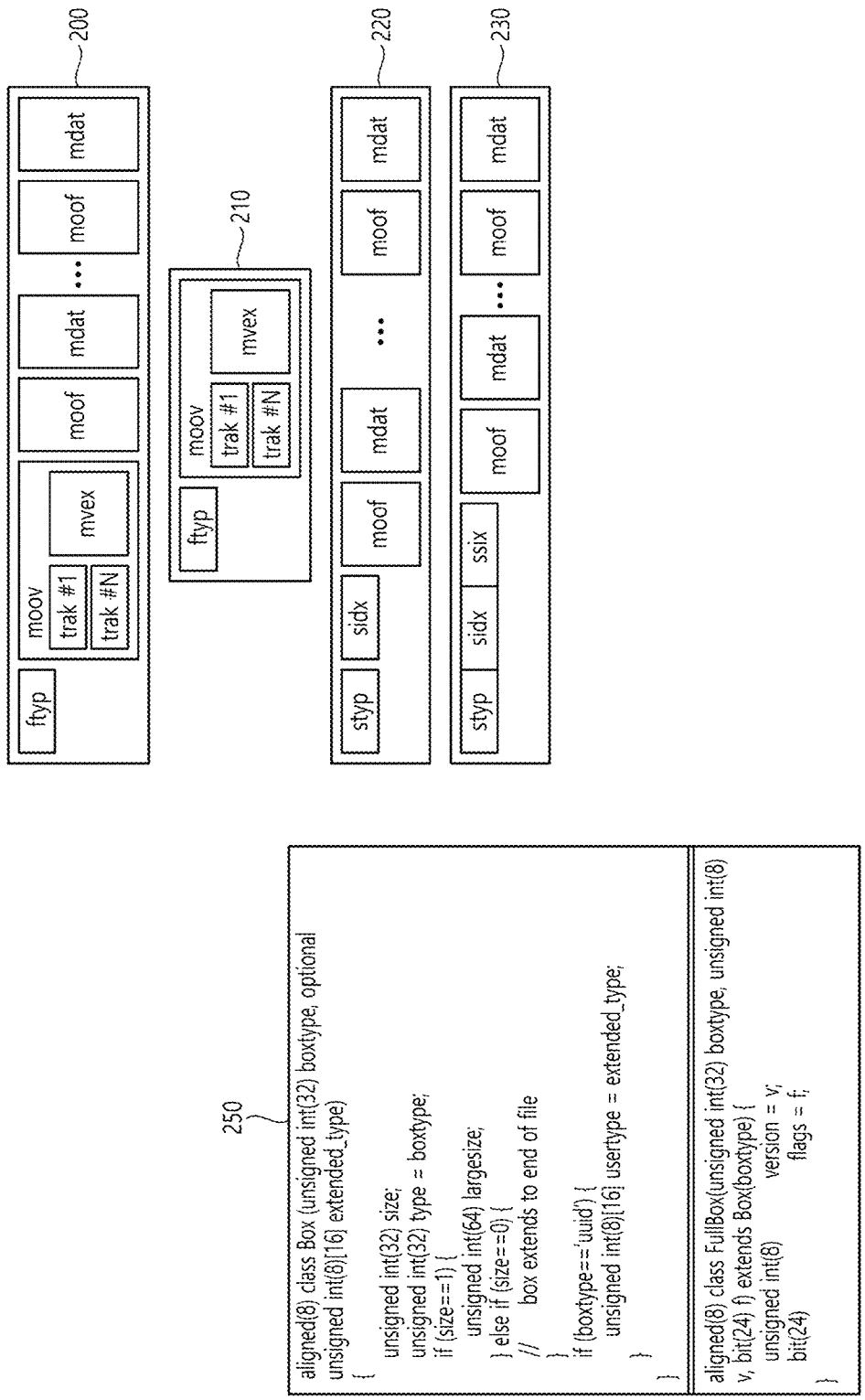
FIGS. 2 and 3 are views illustrating a structure of a media file according to an embodiment of the present invention.
Figure 3:
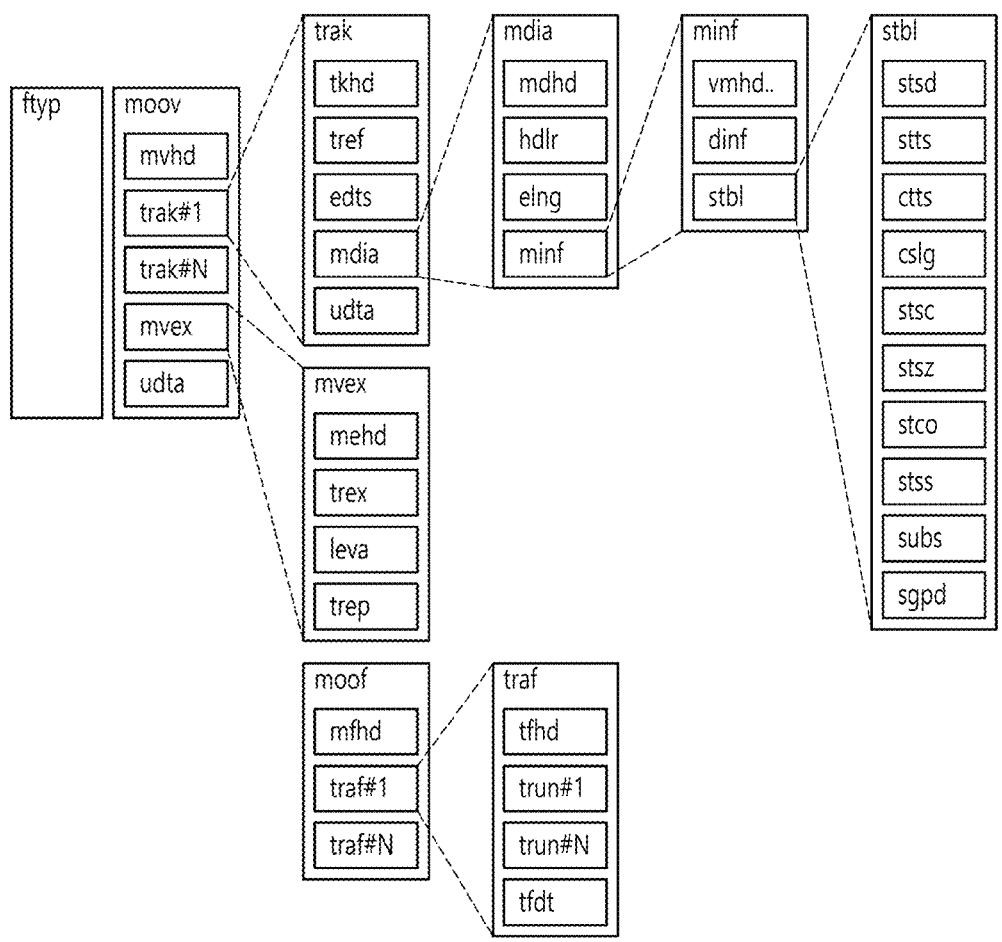

FIGS. 2 and 3 are views illustrating a structure of a media file according to an embodiment of the present invention.

The media file according to the present invention may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present invention may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present invention may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Figure 4:
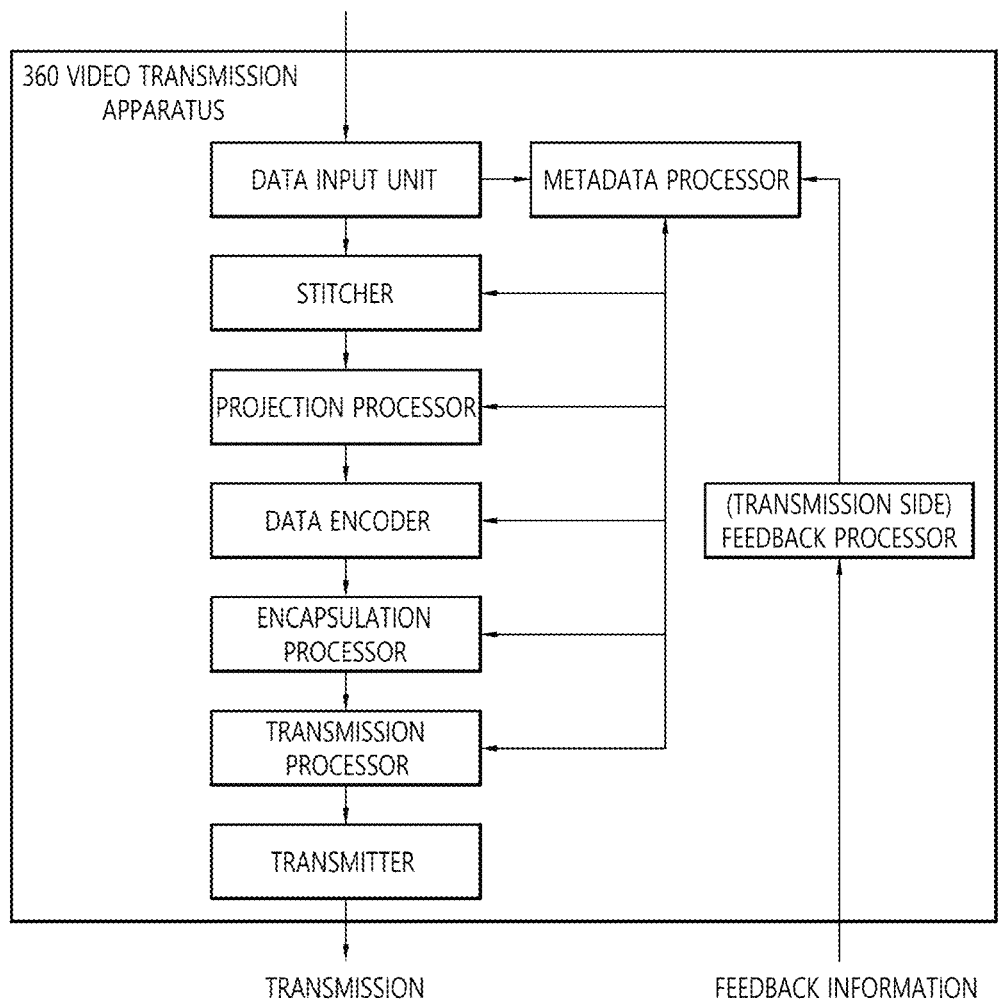
FIG. 4 is a view schematically illustrating a configuration of a 360 video transmission apparatus to which the present invention is applicable.

FIG. 4 is a view schematically illustrating a configuration of a 360 video transmission apparatus to which the present invention is applicable.

The 360 video transmission apparatus according to the present invention can perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to the present invention, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to the present invention, the 360 video transmission apparatus may further include a (transmission side) feedback processor and/or a network interface (not shown) as internal/external elements. The network interface can receive feedback information from a 360 video reception apparatus according to the present invention and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to the present invention, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to the present invention, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to the present invention, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to the present invention may be hardware elements. According to an embodiment, the internal/external elements may be changed, omitted, replaced by other elements or integrated.

FIG. 5 is a view schematically illustrating a configuration of a 360 video reception apparatus to which the present invention is applicable.

The 360 video reception apparatus according to the present invention can perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360 video data transmitted from the 360 video transmission apparatus according to the present invention. The receiver may receive the 360 video data through a broadcast network or a broadband depending on a channel through which the 360 video data is transmitted.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to the present invention, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to the present invention may be hardware elements. According to an embodiment, the internal/external elements may be changed, omitted, replaced by other elements or integrated. According to an embodiment, additional elements may be added to the 360 video reception apparatus.

Another aspect of the present invention may pertain to a method for transmitting a 360 video and a method for receiving a 360 video. The methods for transmitting/receiving a 360 video according to the present invention may be performed by the above-described 360 video transmission/reception apparatuses or embodiments thereof.

Embodiments of the above-described 360 video transmission/reception apparatuses and transmission/reception methods and embodiments of the internal/external elements of the apparatuses may be combined. For example, embodiments of the projection processor and embodiments of the data encoder may be combined to generate as many embodiments of the 360 video transmission apparatus as the number of cases. Embodiments combined in this manner are also included in the scope of the present invention.

FIGS. 6a and 6b are views illustrating 360 video related metadata according to an embodiment of the present invention.

The aforementioned 360 video related metadata may include various types of metadata about a 360 video. The 360 video related metadata may be called 360 video related signaling information according to context. The 360 video related metadata may be included in a separate signaling table and transmitted, included in a DASH MPD and transmitted, or included in the form of a box in a file format such as ISOBMFF and delivered. When the 360 video related metadata is included in the form of a box, the 360 video related metadata may be contained in various levels such as a file, a fragment, a track, a sample entry and a sample and may include metadata about data of the corresponding level.

According to an embodiment, some of metadata which will be described later may be configured as a signaling table and delivered and the remaining metadata may be included in the form of a box or a track in a file format.

According to an embodiment of the 360 video related metadata according to the present invention, the 360 video related metadata may include basic metadata about a projection scheme and the like, metadata related to stitching of a reception side, metadata related to a 360 video support range, stereoscopic related metadata, initial view/initial viewpoint related metadata, FOV (Field of View) related metadata, cropped region related metadata and/or region related metadata. According to an embodiment, the 360 video related metadata may further include metadata in addition to the aforementioned metadata.

Embodiments of the 360 video related metadata according to the present invention may include at least one of the aforementioned basic metadata, metadata related to stitching at a reception side, support range related metadata, stereoscopic related metadata, initial view/initial viewpoint related metadata, FOV related metadata, cropped region related metadata and/or metadata which may be added later. Embodiments of the 360 video related metadata according to the present invention may be configured in various manners depending on the number of cases of detailed metadata included therein. According to an embodiment, the 360 video related metadata may further include additional information in addition to the aforementioned data.

The basic metadata may include projection scheme related information. Specifically, the basic metadata may include a projection_scheme field. According to an embodiment, the basic metadata may further include additional information.

The projection_scheme field can indicate a projection scheme used for corresponding 360 video data to be projected on a 2D image. For example, the projection_scheme field can indicate an equirectangular projection scheme, a cubic projection scheme, a cylindrical projection scheme, a tile-based projection scheme, a pyramid projection scheme and a panoramic projection scheme when set to 0, 1, 2, 3, 4 and 5, respectively. The projection_scheme field can indicate a projection scheme in which the 360 video data is projected on a 2D image without stitching when set to 6. Cases in which the projection_scheme field has other values may be reserved for future use.

According to an embodiment, the 360 video related metadata may further include detailed information about regions according to the projection scheme indicated by the projection_scheme field. Here, detailed information about regions may refer to information such as whether the regions have rotated and the radius of a top region of a cylinder, for example. Metadata regarding detailed information about regions according to the projection scheme may be called projection_scheme field related metadata.

The projection_scheme field related metadata can provide detailed information about each indicated projection scheme (equirectangular projection scheme, cubic projection scheme, cylindrical projection scheme, pyramid projection scheme, panoramic projection scheme, projection without stitching or the like). Details of this detailed information will be described later.

According to an embodiment, the projection_scheme field related metadata may further include additional information. According to an embodiment, detailed fields of the projection_scheme field related metadata may be classified as other metadata.

The metadata related to stitching at a reception side can provide information necessary when stitching is performed at the reception side. A case in which stitching is performed at a reception side may be a case in which 360 video data is projected on a 2D image and transmitted without being stitched by the stitcher of the above-described 360 video transmission apparatus. In this case, the projection_scheme field can be set to 6 as described above.

In this case, the above-described 360 video reception apparatus can extract 360 video data projected on a decoded 2D image and stitch the 360 video data. In this case, the 360 video reception apparatus may further include a stitcher. The stitcher of the 360 video reception apparatus can perform stitching using "metadata related to stitching at a reception side". The re-projection processor and the renderer of the 360 video reception apparatus can re-project and render the 360 video data stitched at the reception side on a 3D space.

For example, when 360 video data is generated live, immediately delivered to a reception side and consumed by a user, stitching at the reception side may be more efficient for rapid data delivery. Further, when 360 video data is simultaneously delivered to a device which supports VR and a device which does not support VR, stitching at the reception side may be more efficient. This is because the device supporting VR can stitch the 360 video data and provide the 360 video data as VR content and the device which does not support VR can provide 360 video data on a 2D image through a normal screen instead of VR display.

The metadata related to stitching at a reception side may include a stitched_flag field, a camera_info_flag field and/or an is_not_centered field. Here, since the metadata related to stitching at a reception side may not be used only at the reception side according to an embodiment, it may be called simply stitching related metadata.

The stitched_flag field can indicate whether stitching has been performed on the corresponding 360 video acquired (captured) through at least one camera sensor. This field can have a false value when the aforementioned projection_scheme field is set to 6.

The camera_info_flag field can indicate whether detailed information about a camera used to capture the corresponding 360 video data is provided as metadata.

When the aforementioned stitched_flag field indicates that stitching has been performed, the metadata related to stitching at a reception side may include a stitching_type field and/or a num_camera field.

The stitching_type field can indicate a stitching type applied to the corresponding 360 video data. The stitching type may be information regarding stitching software. A 360 video may be differently projected on a 2D image according to stitching types even when the same projection scheme is used. Accordingly, when stitching type information is provided, the 360 video reception apparatus can perform re-projection using the information.

The num_camera field can indicate the number of cameras used to capture the corresponding 360 video data.

When the aforementioned camera_info_flag field indicates that detailed information about the camera is provided as metadata, the metadata related to stitching at a reception side may further include the num_camera field. The meaning of the num_camera field has been described. When the num_camera field is included according to the value of a stitched_flag field, the num_camera field may be redundantly included. In this case, one of the two fields may be omitted in the 360 video related metadata.

Information about as many cameras as the number indicated by the num_camera field can be included. Information about each of the cameras may include an intrinsic_camera_params field, an extrinsic_camera_params field, a camera_center_pitch field, a camera_center_yaw field and/or a camera_center_roll field.

For example, the intrinsic_camera_params field can include intrinsic parameters of each camera used to capture 360 video. Specifically, the intrinsic_camera_params field can include a focal length, a principal point, a skew factor, and the like. Detailed signaling information of the intrinsic_camera_params field will be described later.

For example, the extrinsic_camera_params field can include extrinsic parameter information of each camera used to capture the 360 video. Specifically, the extrinsic_camera_params field can include rotation and translation of each camera based on the world coordinate system. Detailed signaling information of the extrinsic_camera_params field will be described later.

In addition, the camera_center_pitch field can indicate a pitch value of the center point of an image acquired from each camera used to capture a 360 video. Alternatively, the camera_center_pitch field may indicate a phi value of the center point in a capture space coordinate system. Here, a capture space can represent a space in which a 360 video is captured and the capture space coordinate system can refer to spherical coordinates representing the capture space.

Further, the camera_center_yaw field can indicate a yaw value of the center point of an image acquired from each camera used to capture a 360 video. Alternatively, the camera_center_yaw field may indicate a theta value of the center point in the capture space coordinate system.

Further, the camera_center_roll field can indicate a roll value of the center point of an image acquired form each camera used to capture a 360 video. The is_not_centered field can indicate whether the center pixel of a 2D image on which the corresponding 360 video data is projected corresponds to the center point on a 3D space (spherical surface). In other words, this field can indicate whether the center point of a 3D space has changed (rotated) from the coordinates of the origin of the world coordinate system or the capture space coordinate system when the corresponding 360 video data is projected or re-projected on the 3D space. A capture space can represent a space in which a 360 video is captured and the capture space coordinate system can refer to spherical coordinates representing the capture space. Further, the center pixel of the 2D image may be derived as the bottom-right pixel or the top-left pixel among four pixels located at the center of the 2D image when the 2D image is composed of an even number of horizontal and vertical pixels.

The 3D space on which the 360 video data is projected/re-projected may be rotated with respect to the origin of the capture space coordinate system or the origin of the world coordinate system. In this case, the center point of the 3D space does not correspond to the origin of the capture space coordinate system or the origin of the world reference frame. The is_not_centered field can indicate whether such change (rotation) has occurred. According to an embodiment, the center point of the 3D space can correspond to the point on the 3D space which indicates the center pixel of the 2D image.

Here, the center point of the 3D space may be called orientation of the 3D space. Here, the center point of the 3D space can refer to a point corresponding to θ=0 and φ=0 when the 3D space is represented in the spherical coordinates and refer to a point corresponding to pitch=0, yaw=0 and roll=0 when the 3D space is represented in the yaw/pitch/roll coordinate system. This field can indicate that the center point of the 3D space is matched/mapped to the origin of the capture space coordinate system or the origin of the world coordinate system when set to 0. Here, the 3D space may be called a projection structure or VR geometry.

FIG. 7 illustrates a spherical coordinate system. 360 video data acquired from a camera can be represented a spherical surface. As shown in FIG. 7(a), each point on a spherical surface can be represented using r (the radius of a sphere), θ (rotation direction and degree based on z-axis) and φ (rotation direction and degree toward z-axis of x-y plane) using the spherical coordinate system. According to an embodiment, the spherical surface may be consistent with the world coordinate system or the principal point of the front camera may be assumed to be a point (r, 0, 0) of the spherical surface.

As shown in FIG. 7(b), 360 video data of the spherical surface can be mapped on a 2D image represented by the XY coordinates in a projection procedure. The left-top of the XY coordinates is the origin (0, 0), the x-axis coordinate value can increase to the right and the y-axis coordinate value can increase downward based on the origin (0, 0). Here, 360 video data (r, θ, φ) on the spherical surface can be transformed into the XY coordinates through the following equations.

$$x=(\theta-\theta_0)*\cos(\varphi_0)*r$$

$$y=\varphi*r \quad \text{[Equation 1]}$$

Here, $\theta_0$ represents a central meridian of projection, r represents a radius, and $\varphi_0$ can be fixed to $\varphi_0=0$ in the equirectangular projection scheme. If ranges of x and y of the XY coordinates are $-\pi r*\cos(\varphi_0) \leq x \leq \pi r*\cos(\varphi_0)$ and $-\pi/2*r \leq y \leq \pi/2*r$, ranges of θ and φ may be $-\pi+\theta_0 \leq \theta \leq \pi+\theta_0$ and $-\pi/2 \leq \varphi \leq \pi/2$.

A value (X, y) transformed into the XY coordinates can be transformed into a pixel (X, Y) on the 2D image through the following equations.

$$X=K_x*x+X_O=K_x*(\theta-\theta_0)*\cos(\varphi_0)*r+X_O$$

$$Y=-K_y*y-Y_O \quad \text{[Equation 2]}$$

Here, $K_x$ and $K_y$ are scaling factors with respect to the X-axis and Y-axis of a 2D image when projection is performed on the 2D image, $X_o$ is an offset value representing a degree of movement on the x-axis with respect to an x-coordinate value scaled according to the value $K_x$, and $Y_o$ is an offset value representing a degree of movement on the y-axis with respect to a y-coordinate value scaled according to the value $K_y$. $K_x$ may be (the width of a mapped image)/$(2\pi r*\cos(\varphi_0))$ and $K_y$ may be (the height of the mapped image)/πr.

According to an embodiment of the present invention, the aforementioned is_not_centered field may have a different meaning using the value of the projection_scheme field as a variable. For example, the is_not_centered field can represent information as shown in the following table according to a projection scheme indicated by the projection_scheme field.

TABLE 1

| Projection_scheme value | Meaning |
|---|---|
| 0, 3, 5 | This can indicate whether the center pixel of a 2D image is mapped to a point corresponding to θ = 0 and φ = 0 (which may be a point corresponding to pitch = 0 and yaw = 0) on the spherical surface. When is_not_centered value is "0", it can represent that the center pixel of the image is mapped to the point corresponding to θ = 0 and φ = 0 on the spherical surface. |
| 1 | This can indicate whether the center pixel of a region representing a front in a 2D image is mapped to a point corresponding to θ = 0 and φ = 0 (which may be a point corresponding to pitch = 0 and yaw = 0) on the spherical surface. When is_not_centered value is "0", it can represent that the center pixel of the image is mapped to the point corresponding to θ = 0 and φ = 0 on the spherical surface. |
| 2 | This can indicate whether the center pixel of a region representing a side in a 2D image is mapped to a point corresponding to θ = 0 and φ = 0 (which may be a point corresponding to pitch = 0 and yaw = 0) on the spherical surface. When is_not_centered value is "0", it can represent that the center pixel of the image is mapped to the point corresponding to θ = 0 and φ = 0 on the spherical surface. |
| 4 | This can indicate whether the center pixel of a region representing a front in a 2D image is mapped to a point corresponding to θ = 0 and φ = 0 (which may be a point corresponding to pitch = 0 and yaw = 0) on the spherical surface. When is_not_centered value is "0", it can represent that the center pixel of the image is mapped to the point corresponding to θ = 0 and φ = 0 on the spherical surface. |

Specifically, when the projection_scheme field has a value of 0, 3 or 5, that is, an equirectangular projection scheme, a tile-based projection scheme or a panoramic projection scheme among projection schemes is used for projection, the is_not_centered field can indicate whether the center pixel of a 2D image is mapped to a point corresponding to θ=0 and φ=0 on a spherical surface. The point corresponding to θ=0 and φ=0 on the spherical surface may be identical to a point corresponding to pitch=0 and yaw=0. When the is_not_centered field has a value of 0, the center pixel can be mapped to the point corresponding to θ=0 and φ=0 on the spherical surface.

In addition, the projection_scheme field has a value of 1, that is, a cubic projection scheme among projection schemes is used for projection, the is_not_centered field can indicate whether the center pixel of a region representing a front in a 2D image is identical to a point corresponding to θ=0 and φ=0 on a spherical surface. The point corresponding to θ=0 and φ=0 on the spherical surface may be identical to a point corresponding to pitch=0 and yaw=0. When the is_not_centered field has a value of 0, the center pixel can be mapped to the point corresponding to θ=0 and φ=0 on the spherical surface.

Further, the projection_scheme field has a value of 2, that is, a cylindrical projection scheme among projection schemes is used for projection, the is_not_centered field can indicate whether the center pixel of a region representing a side in a 2D image is identical to a point corresponding to θ=0 and φ=0 on a spherical surface. The point corresponding to θ=0 and φ=0 on the spherical surface may be identical to a point corresponding to pitch=0 and yaw=0. When the is_not_centered field has a value of 0, the center pixel can be mapped to the point corresponding to θ=0 and φ=0 on the spherical surface.

In addition, the projection_scheme field has a value of 4, that is, a pyramid projection scheme among projection schemes is used for projection, the is_not_centered field can indicate whether the center pixel of a region representing a front in a 2D image is identical to a point corresponding to θ=0 and φ=0 on a spherical surface. The point corresponding to θ=0 and φ=0 on the spherical surface may be identical to a point corresponding to pitch=0 and yaw=0. When the is_not_centered field has a value of 0, the center pixel can be mapped to the point corresponding to θ=0 and φ=0 on the spherical surface.

Meanwhile, the aforementioned is_not_centered field indicates the center point of a 3D space (spherical surface) has rotated, 360 video related metadata may further include a center_theta field and/or a center_phi field. According to an embodiment, the center_theta field and the center_phi field may be replaced by a center_pitch field, a center_yaw field and/or a center_roll field. These fields may indicate a point on the 3D space (spherical surface) mapped to the center pixel of a 2D image as (θ, φ) values or (yaw, pitch, roll) values. For example, the center_theta field can represent information as shown in the following table according to the value of the aforementioned projection_scheme field.

TABLE 2

| Projection_scheme value | Meaning |
| --- | --- |
| 0, 3, 5 | θ (theta) on spherical coordinates of a capture space mapped to the center pixel of 2D image or a yaw value during rendering |
| 1 | θ (theta) on the spherical coordinates of the capture space mapped to the center pixel of a region representing a front face in a 2D image or a yaw value during rendering |
| 2 | θ (theta) on the spherical coordinates of the capture space mapped to the center pixel of a region representing a side face in a 2D image or a yaw value during rendering |
| 4 | θ (theta) on the spherical coordinates of the capture space mapped to the center pixel of a region representing a front face in a 2D image or a yaw value during rendering |

Specifically, when the projection_scheme field has a value of 0, 3 or 5, that is, the equirectangular projection scheme, the tile-based projection scheme or the panoramic projection scheme among projection schemes is used for projection, for example, the aforementioned center_theta field can indicate a θ value or a yaw value of a point on the spherical coordinates mapped to the center pixel in a 2D image. When the projection_scheme field has a value of 0, that is, the projection_scheme field indicates the equirectangular projection scheme, $θ_0$ in Equation 3 can be the same as the value of the center_theta field.

In addition, when the projection_scheme field has a value of 1, that is, the cubic projection scheme among projection schemes is used for projection, for example, the center_theta field can indicate a θ value or a yaw value of a point on the spherical coordinates mapped to the center pixel of a region representing a front in a 2D image.

When the projection_scheme field has a value of 2, that is, the cylindrical projection scheme among projection schemes is used for projection, for example, the center_theta field can indicate a θ value or a yaw value of a point on the spherical coordinates mapped to the center pixel of a region representing a side in a 2D image.

Further, when the projection_scheme field has a value of 4, that is, the pyramid projection scheme among projection schemes is used for projection, for example, the center_theta field can indicate a θ value or a yaw value of a point on the spherical coordinates mapped to the center pixel of a region representing a front in a 2D image.

In addition, the aforementioned center_phi field may represent information as shown in the following table according to the value of the projection_scheme field.

TABLE 3

| Projection_Scheme value | Meaning |
| --- | --- |
| 0, 3, 5 | A phi or pitch value on the spherical coordinates during capture which is mapped to the center pixel of a 2D image |
| 1 | A phi or pitch value on the spherical coordinates during capture which is mapped to the center pixel of a region representing a front face in a 2D image |
| 2 | A phi or pitch value on the spherical coordinates during capture which is mapped to the center pixel of a region representing a side face in a 2D image |
| 4 | A phi or pitch value on the spherical coordinates during capture which is mapped to the center pixel of a region representing a front face in a 2D image |

Specifically, when the projection_scheme field has a value of 0, 3 or 5, that is, the equirectangular projection scheme, the tile-based projection scheme or the panoramic projection scheme among projection schemes is used for projection, for example, the center_theta field can indicate a φ value or a pitch value of a point on the spherical coordinates which is mapped to the center pixel in a 2D image.

In addition, when the projection_scheme field has a value of 1, that is, the cubic projection scheme among projection schemes is used for projection, for example, the center_theta field can indicate a φ value or a pitch value of a point on the spherical coordinates which is mapped to the center pixel of a region representing a front in a 2D image.

Further, when the projection_scheme field has a value of 2, that is, the cylindrical projection scheme among projection schemes is used for projection, for example, the center_theta field can indicate a φ value or a pitch value of a point on the spherical coordinates which is mapped to the center pixel of a region representing a side in a 2D image.

In addition, when the projection_scheme field has a value of 4, that is, the pyramid projection scheme among projection schemes is used for projection, for example, the center_theta field can indicate a φ value or a pitch value of a point on the spherical coordinates which is mapped to the center pixel of a region representing a front in a 2D image.

Further, a degree of rotation of the center point of a 3D space with respect to the origin of the capture space coordinate system or the origin of the world coordinate system can be indicated using the center_pitch field, the center_yaw field and/or the center_roll field according to an embodiment. In this case, the fields can indicate a degree of rotation using pitch, yaw and roll values.

Stereoscopic related metadata may include information about 3D related attributes of 360 video data. The stereoscopic related metadata may include a stereo_mode field. According to an embodiment the stereoscopic related metadata may further include additional information.

The stereo_mode field can indicate a 3D layout supported by corresponding 360 video. For example, a 3D layout indicated by the stereo_mode field may be derived as shown in the following table.

TABLE 4

| stereo_mode Value | Meaning |
|---|---|
| 0 | Mono (video frame contains a single mono view) |
| 1 | Left-right (Left half contains the left eye while the right half contains the right eye) |
| 2 | Top-bottom (Left half contains the left eye while the right half contains the right eye) |
| 3-8 | Reserved Future use |

When the stereo_mode field is 0, corresponding 360 video may be a mono mode. That is, a projected 2D image may include only one mono view. In this case, the corresponding 360 video may not support 3D.

When this field is 1, corresponding 360 video may conform to a left-right layout. When this field is 2, corresponding 360 video may conform to a top-bottom layout. The left-right layout and the top-bottom layout may also called a side-by-side format and a top-bottom format. In the case of the left-right layout, 2D images on which a left image/right image are projected may be located on the left/right in an image frame. In the case of the top-bottom layout, 2D images on which left image/right image are projected may be located at the top/bottom in an image frame. When the field has other values, this can be reserved for future use.

Metadata related to a range supported by a 360 video can include information about a range supported by the 360 video on a 3D space. The metadata related to a range supported by a 360 video can include an is_pitch_angle_less_180 field, an is_yaw_angle_less_360 field and/or an is_yaw_only field. According to an embodiment, the metadata related to a range supported by a 360 video may further include additional information. According to an embodiment, detailed fields of the metadata related to a range supported by a 360 video may be classified into other pieces of metadata.

The is_pitch_angle_less_180 field can indicate whether a pitch range on a 3D space covered (supported) by the corresponding 360 video is less than 180 degrees when the corresponding 360 video is reprojected or rendered on the 3D space. That is, this field can indicate whether a difference between a maximum value and a minimum value of a pitch angle supported by the corresponding 360 video is less than 180 degrees.

The is_yaw_angle_less_360 field can indicate whether a yaw range on a 3D space covered (supported) by the corresponding 360 video is less than 360 degrees when the corresponding 360 video is reprojected or rendered on the 3D space. That is, this field can indicate whether a difference between a maximum value and a minimum value of a yaw angle supported by the corresponding 360 video is less than 360 degrees.

If the is_pitch_angle_less_180 field indicates that a supported pitch range is less than 180 degrees, metadata related to a range supported by the corresponding 360 video may further include a min_pitch field and/or a max_pitch field.

The min_pitch field and the max_pitch field can indicate a minimum value and a maximum value of a pitch (or φ) supported by the corresponding 360 video when the corresponding 360 video is reprojected or rendered on a 3D space.

If the is_yaw_angle_less_360 field indicates that a supported pitch range is less than 360 degrees, metadata related to a range supported by the corresponding 360 video may further include a min_yaw field and/or a max_yaw field.

The min_yaw field and the max_yaw field can indicate a minimum value and a maximum value of a yaw (or θ) supported by the corresponding 360 video when the corresponding 360 video is reprojected or rendered on a 3D space.

The is_yaw_only field can be a flag indicating that user interaction with respect to the corresponding 360 video is restricted only in the yaw direction. That is, this field can be a flag indicating a head motion with respect to the corresponding 360 video is restricted only in the yaw direction. For example, when this field is set, 360 video experience in which a rotation direction and angle only in the horizontal direction according to the yaw axis are reflected can be provided when a user wears a VR display and moves the head. When the user moves the head up and down only, a region of the 360 video according thereto cannot change. This field can be classified as metadata other than the metadata related to a range supported by a 360 video.

Initial view related metadata can include information about a view (initial view) seen by a user when the user initially reproduces a 360 video. The initial view related metadata can include an initial_view_yaw_degree field, an initial_view_pitch_degree field and/or an initial_view_roll_degree field. According to an embodiment, the initial view related metadata may further include additional information.

The initial_view_yaw_degree field, the initial_view_pitch_degree field and the initial_view_roll_degree field can indicate an initial view when the corresponding 360 video is reproduced. That is, the center point of a viewport initially seen during reproduction can be indicated by these three fields. Specifically, the initial_view_yaw_degree field can indicate a yaw value with respect to the initial view. That is, the initial_view_yaw_degree field can indicate the position of the center point by a rotation direction (sign) and a rotation degree (angle) based on the yaw axis. In addition, the initial_view_pitch_degree field can indicate a pitch value with respect to the initial view. That is, the initial_view_pitch_degree field can indicate the position of the center point by a rotation direction (sign) and a rotation degree (angle) based on the pitch axis. Further, the initial_view_roll_degree field can indicate a roll value with respect to the initial view. That is, the initial_view_roll_degree field can indicate the position of the center point by a rotation direction (sign) and a rotation degree (angle) based on the roll axis. An initial view when the corresponding 360 video is reproduced, that is, the center point of a viewport initially seen during reproduction, can be indicated based on the initial_view_yaw_degree field, the initial_view_ pitch_degree field and the initial_view_roll_degree field, and thus a specific region of the 360 video can be displayed at the initial view and provided to the user. Further, the width and the height of the initial viewport based on the indicated initial view can be determined through a field of view (FOV). That is, a 360 video reception apparatus can provide a certain region of a 360 video as an initial viewport to the user using the three fields and FOV information.

According to an embodiment, an initial view indicated by the initial view related metadata can change per scene. That is, scenes of a 360 video change with reproduction of 360 content and thus an initial view or an initial viewport initially seen by a user can change per scene of the 360 video. In this case, the initial view related metadata can indicate an initial view per scene. To this end, the initial view related metadata may further include a scene identifier for identifying a scene to which the corresponding initial view is applied. Further, since FOV can change per scene of the 360 video, the initial view related metadata may further include FOV information per scene which indicates an FOV corresponding to a scene.

Cropped region related metadata can include information about a region including actual 360 video data in an image frame. An image frame can include an active video area in which actual 360 video data is projected and other areas. Here, the active video area may be referred to as a cropped region or a default display region. The active video area is an area seen as a 360 video on an actual VR display and a 360 video reception apparatus or a VR display can process/display only the active video area. For example, when the aspect ratio of an image frame is 4:3, only an area of the image frame other than an upper part and a lower part thereof can include 360 video data and this area can be referred to as an active video area.

The cropped region related metadata can include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field can be a flag indicating whether the entire area of an image frame is used by a 360 video reception apparatus or a VR display. Here, an area to which 360 video data is mapped or an area seen on a VR display may be called an active video area. The is_cropped_region field can indicate whether an entire image frame is an active video area. If only a part of an image frame is an active video area, the following four fields can be added.

A cr_region_left_top_x field, a cr_region_left_top_y field, a cr_region_width field and a cr_region_height field can indicate an active video area in an image frame. These fields can indicate the x coordinate of the left-top of the active video area, the y coordinate of the left-top of the active video area, the width of the active video area, and the height of the active video area. The width and the height can be represented in units of pixels.

FOV related metadata can include information about the aforementioned FOV. The FOV related metadata can include a content_fov_flag field, a content_hfov field and/or a content_vfov field.

The content_fov_flag field can indicate whether information about an FOV intended for the corresponding 360 video in production is present. When this field is 1, the content_hfov field and/or the content_vfov field can be present.

The content_hfov field can represent information about a horizontal field of view (FOV) of content intended for the corresponding 360 video in production. A region to be displayed to a user at a time in a 360 image can be determined according to the horizontal FOV of the corresponding 360 video reception apparatus. Alternatively, a region to be displayed to the user at a time may be determined by reflecting the horizontal FOV information of this field therein according to an embodiment. The 360 video reception apparatus (or VR display) can control the FOV of a 360 video displayed to a user at a time by reflecting the horizontal FOV information therein or perform an operation capable of supporting the FOV.

The content_vfov field can represent information about a vertical field of view (FOV) of content intended for the corresponding 360 video in production. A region to be displayed to a user at a time in a 360 image can be determined according to the vertical FOV of the corresponding 360 video reception apparatus. Alternatively, a region to be displayed to the user at a time may be determined by reflecting the vertical FOV information of this field therein according to an embodiment. The 360 video reception apparatus (or VR display) can control the FOV of a 360 video displayed to a user at a time by reflecting the vertical FOV information therein or perform an operation capable of supporting the FOV. Region related metadata can provide metadata related to regions of corresponding 360 video data. The region related metadata can include a region_info_flag field and/or a region field. According to an embodiment, the region related metadata may further include additional information.

The region_info_flag field can indicate whether a 2D image on which corresponding 360 video data is projected is divided into one or more regions. In addition, this field can indicate whether 360 video related metadata includes detailed information about each region.

The region field can include detailed information about each region. This field can have a structure defined by RegionGroup and RegionGroupBox classes. The RegionGroupBox class can generally describe information about a region irrespective of a used projection scheme and the RegionGroup class can describe detailed region information according to a projection scheme using the projection_scheme field as a variable. For example, when a 360 video is mapped to a 2D image based on cubic projection, the region field can include cubic face information per region in the 2D image. This will be described in detail later.

Figure 8B:
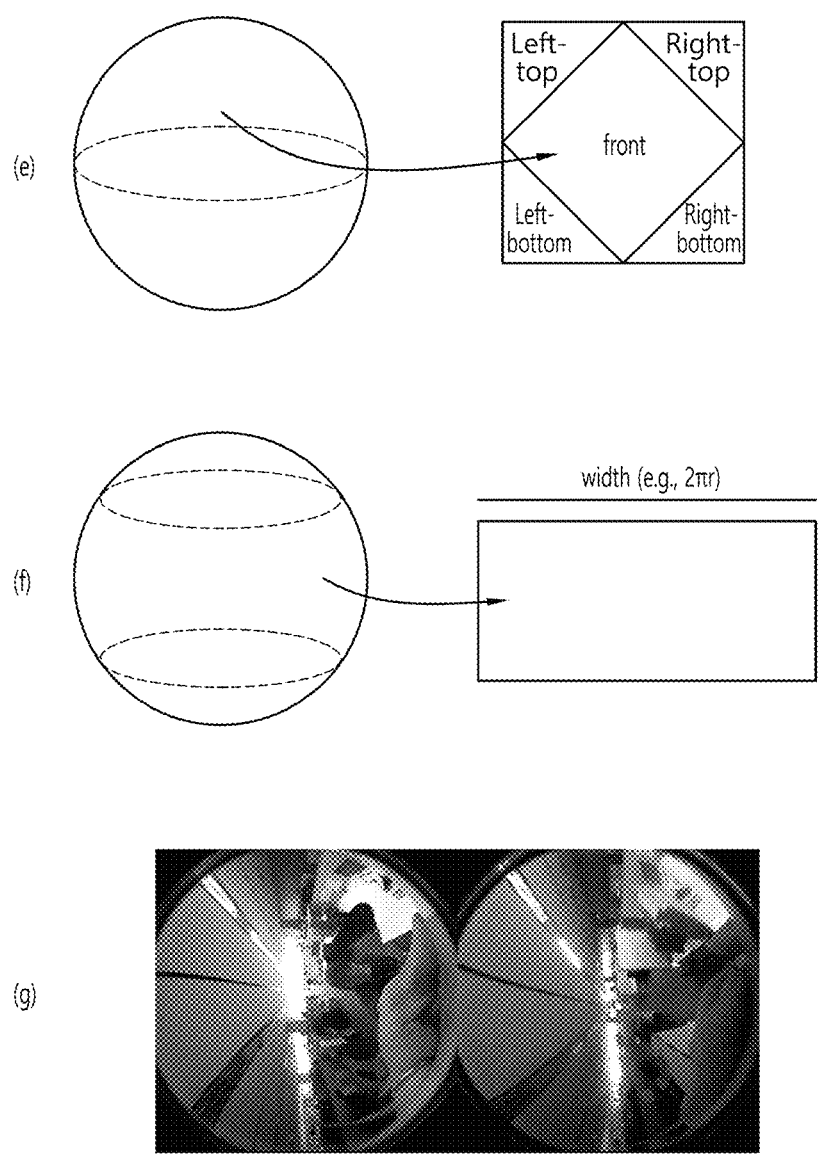

FIGS. 8A and 8B illustrate projection schemes according to the present invention. As described above, projection_scheme field related metadata can include detailed information about a projection scheme indicated by the projection_scheme field among projection schemes illustrated in (a) to (g).

The projection_scheme field related metadata can include a sphere_radius field when the projection_scheme field indicates the equirectangular projection scheme or the tile-based projection scheme. The sphere_radius field can indicate the radius of a sphere applied when 360 video data is mapped to, that is, projected on a 2D image. When the projection_scheme field is 0, that is, when the equirectangular projection scheme among the projection schemes is used for projection, r in the aforementioned equation 2 can be identical to the value of the sphere_radius field.

According to an embodiment of the present invention, projection can be performed using the equirectangular projection scheme. (a) of FIG. 8a illustrates the equirectangular projection scheme. When the projection_scheme field indicates the equirectangular projection_scheme, a point (r, $\theta_0$, 0), that is, a point corresponding to $\theta=\theta_0$ and $\varphi=0$ on a spherical surface can be mapped to the center pixel of a 2D image. In addition, the principal point of a front camera can be assumed as a point (r, 0, 0) of the spherical surface. Further, $\varphi_0$ can be fixed to $\varphi_0=0$. Accordingly, a value (x, y) transformed into the XY coordinates can be transformed into a pixel (X, Y) on the 2D image through the following equations.

$$X=K_x*x+X_O=K_x*(\theta-\theta_0)*r+X_O$$

$$Y=-K_y*y-Y_O \quad \text{[Equation 3]}$$

In addition, when the left-top pixel of the 2D image is located at (0, 0) of the XY coordinates, an offset value with respect to the x axis and an offset value with respect to the y axis can be represented through the following equations.

$$X_O=K_x*\pi*r$$

$$Y_O=-K_y*\pi/2*r \quad \text{[Equation 4]}$$

Using this, the formula for transformation into the XY coordinates represented by Equation 3 can be rearranged as follows.

$$X=K_x x+X_O=K_x*(\pi+\theta-\theta_0)*r$$

$$Y=-K_y y-Y_O=K_y*(\pi/2-\varphi)*r \quad \text{[Equation 5]}$$

For example, when $\theta_0=0$, that is, when the center pixel of a 2D image indicates data corresponding to $\theta=0$ on a spherical surface, the spherical surface can be mapped to a region having a width of $2K_x\pi r$ and a height of $K_x\pi r$ in the 2D image based on (0, 0). Data corresponding to $\varphi=\pi/2$ on the spherical surface can be mapped to the entire upper side of the 2D image. Further, data corresponding to (r, $\pi/2$, 0) on the spherical surface can be mapped to a point corresponding to ($3\pi K_x r/2$, $\pi K_x r/2$) in the 2D image.

A reception side can reproject 360 video data on the 2D image on the spherical surface. This may be represented as a transformation formula as follows.

$$\theta=\theta_0+X/K_x*r-\pi$$

$$\varphi=\pi/2-Y/K_y*r \quad \text{[Equation 6]}$$

For example, a pixel having XY coordinate values of ($K_x\pi r$, 0) in the 2D image can be reprojected on a point corresponding to $\theta=\theta_0$ and $\varphi=\pi/2$ on the spherical surface.

When the equirectangular projection scheme is used, the aforementioned center_theta field can represent the same value as $\theta_0$.

According to another embodiment of the present invention, projection can be performed using the cubic projection scheme. (b) of FIG. 8a illustrates the cubic projection scheme. For example, stitched 360 video data can be represented on a spherical surface. The projection processor can divide the 360 video data into faces of a cube and project the cube on a 2D image. 360 video data on the spherical surface corresponds to each face of the cube and can be projected on the 2D image as shown in the left or right of (b) of FIG. 8a.

According to another embodiment of the present invention, projection can be performed using the cylindrical projection scheme. (c) of FIG. 8a illustrates the cylindrical projection scheme. When it is assumed that stitched 360 video data can be represented on a spherical surface, the projection processor can divide the 360 video data into faces of a cylinder and project the cylinder on a 2D image. 360 video data on the spherical surface corresponds to the side, top and bottom of the cylinder and can be projected on the 2D image as shown in the left or right of (c) of FIG. 8a.

According to another embodiment of the present invention, projection can be performed using the tile-based projection scheme. (d) of FIG. 8a illustrates the tile-based projection scheme. When the tile-based projection scheme is used, the aforementioned projection processor can divide 360 video data on a spherical surface into one or more regions and project the regions on a 2D image, as shown in (d) of FIG. 8a. Such regions may be called tiles.

According to another embodiment of the present invention, projection can be performed using the pyramid projection scheme. (e) of FIG. 8b illustrates the pyramid projection scheme. When it is assumed that stitched 360 video data can be represented on a spherical surface, the projection processor can regard the 360 video data as a pyramid form, divide the 360 video data into faces of a pyramid and project the pyramid faces on a 2D image. 360 video data on the spherical surface corresponds to the front of the pyramid, the left top, left bottom, right top and right bottom of the pyramid in four directions and can be projected on the 2D image as shown in the left or right of (e) of FIG. 8. Here, the front may be a region including data acquired by a front camera.

According to another embodiment of the present invention, projection can be performed using the panoramic projection scheme. (f) of FIG. 8b illustrates the panoramic projection scheme. When the panoramic projection scheme is used, the aforementioned projection processor can project only the side of 360 video data on a spherical surface on a 2D image, as shown in (f) of FIG. 8b. Such regions may be called tiles. This may correspond to a case in which a top and bottom are not present in the cylindrical projection scheme. A panorama_height field can indicate the height of a panorama applied when projection is performed. The projection_scheme field related metadata can include the panorama-height field when the projection_scheme field indicates the panoramic projection scheme.

According to another embodiment of the present invention, projection without stitching can be performed. That is, the projection_scheme field may indicate projection without stitching. (g) of FIG. 8b illustrates a case in which projection without stitching is performed. When projection without stitching is performed, the aforementioned projection processor can project 360 video data on a 2D image as it is, as shown in (g) of FIG. 8b. In this case, stitching is not performed and images acquired by cameras can be projected on a 2D image as they are.

Referring to (g) of FIG. 8b, two images can be projected on a 2D image without stitching. Each image may be a fish-eye image acquired through each sensor in a spherical camera. As described above, a reception side can stitch image data acquired from camera sensors and map the stitched image data on a spherical surface to render a spherical video, that is, a 360 video. Meanwhile, the aforementioned stitched_flag field can indicate whether a 360 video acquired (captured) through at least one camera sensor has been subjected to a stitching process. When the value of the aforementioned projection_scheme field is 6, that is, when the projection_scheme field indicates projection without stitching, the projection_scheme field can have a false value.

Meanwhile, the stereo-mode field can indicate a 3D layout supported by the corresponding 360 video, as described above. The 3D layout indicated by the stereo_mode field value can be derived as shown in FIG. 9.

Figure 9:
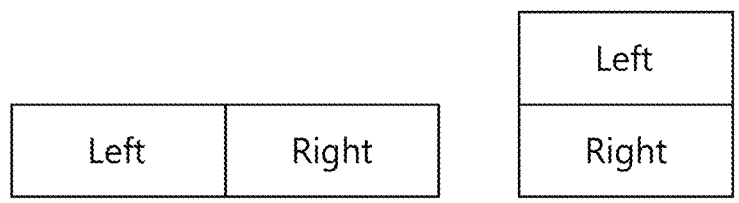
FIG. 9 illustrates an example of a left-right layout and a top-bottom layout.

FIG. 9 shows an example of a left-right layout and a top-bottom layout. The left-right layout and the top-bottom layout may be called a side-by-side format and a top-bottom format. In the case of the left-right layout, 2D images on which left/right images are projected can be positioned on the left and right on an image frame. In the case of the top-bottom layout, 2D images on which left/right images are projected can be positioned at the top and bottom on an image frame.

Meanwhile, as described above, the is_pitch_angle_less_180 field can indicate whether a pitch range on a 3D space covered (supported) by a 360 video is less than 180 degrees when the 360 video is reprojected or rendered on the 3D space, and the is_yaw_angle_less_360 field can indicate whether a yaw range on a 3D space covered (supported) by a 360 video is less than 360 degrees when the 360 video is reprojected or rendered on the 3D space. The concept of aircraft principal axes can be used to represent a specific point, position, direction, interval, region and the like in a 3D space indicated by the aforementioned fields.

Figure 10:
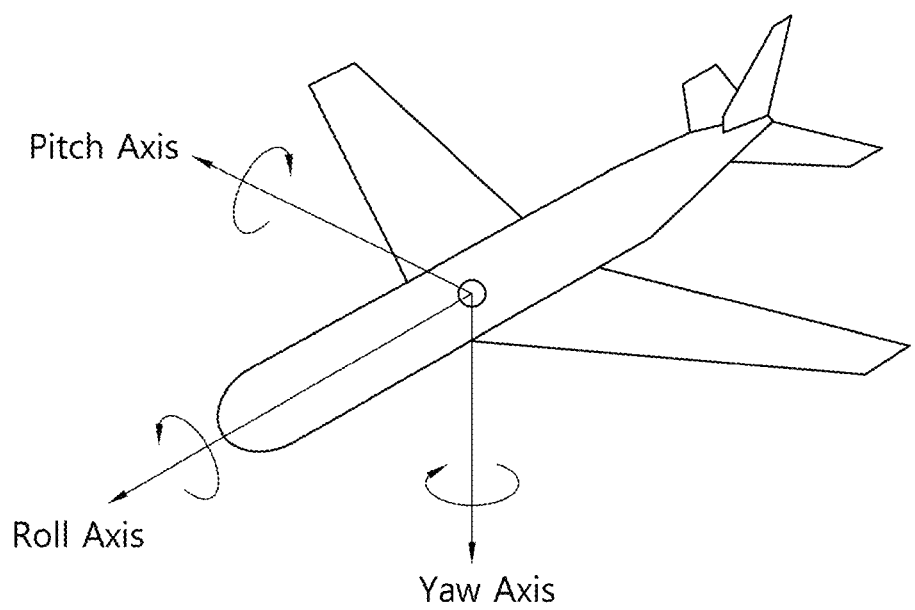
FIG. 10 is a view illustrating the concept of aircraft principal axes for describing a 3D space of the present invention.

FIG. 10 is a view illustrating the concept of aircraft principal axes for describing a 3D space of the present invention. In the present invention, the concept of aircraft principal axes can be used to represent a specific point, position, direction, interval, region and the like in a 3D space. That is, the content of aircraft principal axes can be used to describe a 3D space before projection or after reprojection and perform signaling therefor in the present invention. According to an embodiment, a method using the concept of X, Y and Z axes or spherical coordinates may be used.

An aircraft can freely rotate three-dimensionally. Axes constituting a three dimension are referred to as a pitch axis, a yaw axis and a roll axis. These may be referred to as a pitch, a yaw and a roll or a pitch direction, a yaw direction and a roll direction in the description.

The pitch axis can refer to an axis which is a base of a direction in which the front end of the aircraft rotates up and down. In the illustrated concept of aircraft principal axes, the pitch axis can refer to an axis which connects the wings of the aircraft.

The yaw axis can refer to an axis which is a base of a direction in which the front end of the aircraft rotates to the left and right. In the illustrated concept of aircraft principal axes, the yaw axis can refer to an axis which connects the top to the bottom of the aircraft. The roll axis can refer to an axis which connects the front end to the tail of the aircraft in the illustrated concept of aircraft principal axes, and a rotation in the roll direction can refer to a rotation based on the roll axis. As described above, a 3D space in the present invention can be described using the concept of the pitch, yaw and roll.

FIG. 11 illustrates examples of projection regions on 2D images and 3D models according to 360 video support ranges. As described above, a range on a 3D space supported by a 360 video may be less than 180 degrees in the pitch direction and less than 360 degrees in the yaw direction. In this case, a range supported by the aforementioned 360 video support range related metadata can be signaled.

When a supported range is less than 180 degrees and 360 degrees, 360 video data can be projected on only a part of a 2D image instead of the entire 2D image. In this case, the aforementioned 360 video support range related metadata can be used to notify a receiver side that the 360 video data has been projected on only a part of the 2D image. The 360 video reception apparatus can process only the part of the 2D image in which the 360 video data is actually present.

For example, when a pitch range supported by a 360 video is −45 degrees to 45 degrees, the 360 video may be projected on a 2D image through equirectangular projection, as shown in (a) of FIG. 11. Referring to (a) of FIG. 11, 360 video data can be present only in a specific region of the 2D image. Here, height information about the region in which the 360 video data is present in the 2D image can be further included in the metadata in the form of a pixel value.

In addition, when a yaw range supported by a 360 video is −90 degrees to 90 degrees, for example, the 360 video may be projected on a 2D image through equirectangular projection, as shown in (b) of FIG. 11. In (b), 360 video data can be present only in a specific region of the 2D image. Here, width information about the region in which the 360 video data is present in the 2D image can be further included in the metadata in the form of a pixel value.

Information related to a range supported by a 360 video can be delivered to a reception side as 360 video related metadata to improve transmission capacity and scalability. Only pitch and yaw regions instead of an entire 3D space (e.g., spherical surface) may be captured depending on content. In such a case, even when 360 video data is projected on a 2D image, the 360 video data may be present only in a region of the 2D image. Metadata indicating the region on which the 360 video data has been projected is delivered such that the reception side can process only the region. Further, additional data can be transmitted through the remaining region, increasing transmission capacity.

Figure 12:
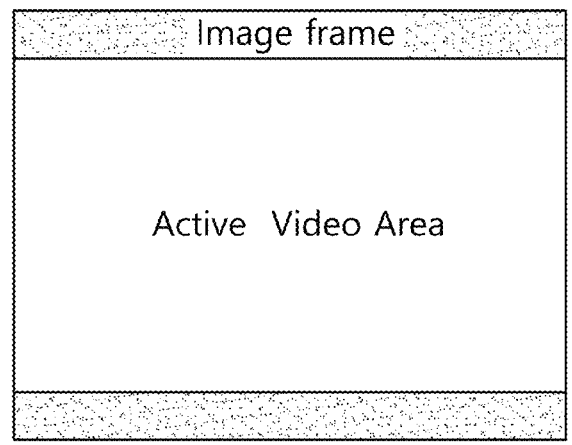
FIG. 12 illustrates an example of an active video area.

Meanwhile, when the aforementioned is_cropped_region field indicates that the entire area of an image frame is not used by a 360 video reception apparatus or a VR display, a region to which 360 video data is mapped or a region viewed on the display, that is, an active video area used by the 360 video reception apparatus or the VR display, may be as shown in FIG. 12.

FIG. 12 illustrates an example of the active video area. The aforementioned is_cropped_region field may be a flag indicating whether the entire are of an image frame is used by a 360 video reception apparatus (or VR display) or only a region of the image frame is used by the 360 video reception apparatus (or VR display). Here, a region to which 360 video data is mapped or a region viewed on the VR display can be called an active video area. The aforementioned is_cropped_region field can indicate whether an entire image frame is an active video area. For example, when the aspect ratio of an image frame is 4:3, a 360 video can be mapped to only a region of the image frame, as shown in FIG. 12. In this case, the 360 video reception apparatus (or VR display) can process (or display) only the active video area.

Meanwhile, the aforementioned projection_scheme field related metadata can provide detailed information about indicated projection schemes (equirectangular projection scheme, cubic projection scheme, cylindrical projection scheme, pyramid projection scheme, panoramic projection scheme, projection without stitching, and the like) as follows.

Figure 13A:
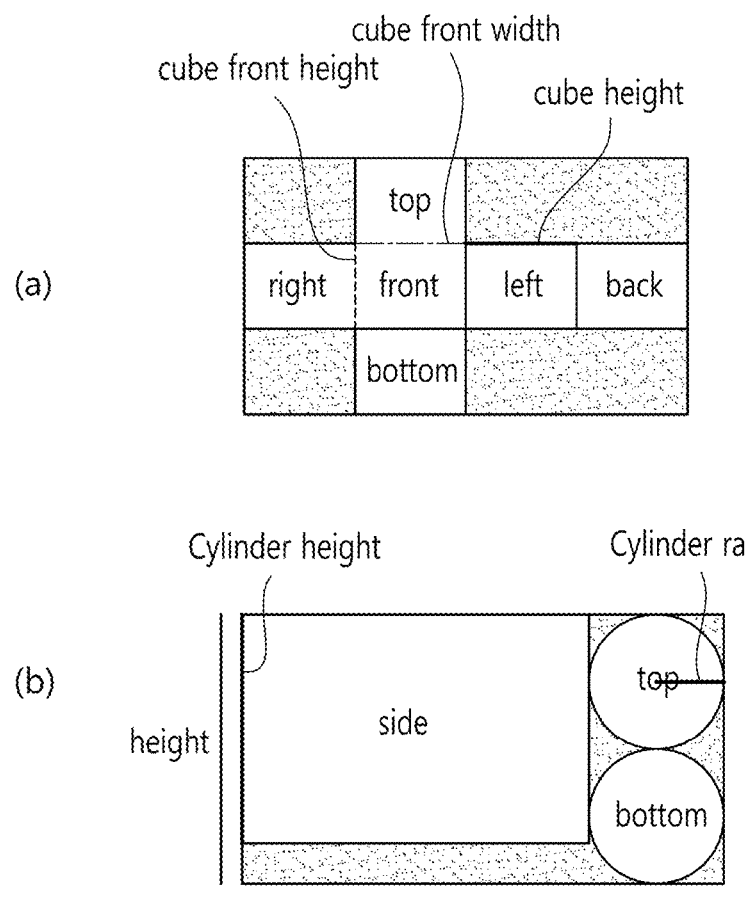

FIGS. 13a and 13b illustrate examples of detailed information about respective projection schemes. For example, when the projection_scheme field is set to 1, that is, the projection_scheme field indicates the cubic projection scheme, the projection_scheme field related metadata can include a cube_front_width field, a cube_front_height field and/or a cube_height field. As shown in (a) of FIG. 13a, the cube_front_width field can indicate the width of the front of a cube applied when 360 video data is mapped to, that is, projected on a 2D image, the cube_front_height field can indicate the height of the front of a cube applied when 360 video data is mapped to, that is, projected on a 2D image, and the cube_height field can indicate the height between the front and sides of a cube applied when 360 video data is mapped to, that is, projected on a 2D image.

In addition, when the projection_scheme field is set to 2, that is, when the projection_scheme field indicates the cylindrical projection scheme, for example, the projection_scheme field related metadata can include a cylinder_radius field and/or a cylinder_height field. As shown in (b) of FIG. 13a, the cylinder_radius field can indicate the radius of the top/bottom of a cylinder applied when 360 video data is mapped to, that is, projected on a 2D image, and the cylinder_height field can indicate the height of a cylinder applied when 360 video data is mapped to, that is, projected on a 2D image.

In addition, when the projection_scheme field is set to 4, that is, the projection_scheme field indicates the pyramid projection scheme, the projection_scheme field related metadata can include a pyramid_front_width field, a pyramid_front_height field, a pyramid_front_rotation field and/or a pyramid_height field. As shown in (c) of FIG. 13b, the pyramid_front_width field can indicate the width of the front of a pyramid applied when 360 video data is mapped to, that is, projected on a 2D image, and the pyramid_front_height field can indicate the height of the front of a pyramid applied when 360 video data is mapped to, that is, projected on a 2D image. In addition, the pyramid_front_rotation field can indicate a rotation degree and direction of the front of the pyramid. (c) of FIG. 3b illustrates a case in which pyramid_front_rotation=0, that is, a case 1310 in which the front of the pyramid is not rotated and a case in which pyramid_front_rotation=45, that is, a case 1320 in which the front of the pyramid is rotated by 45 degrees. Further, the pyramid_height field can indicate the height between the front and sides of a pyramid applied when 360 video data is mapped to, that is, projected on a 2D image. When the front of the pyramid is not rotated, a final 2D image on which the 360 video data is projected may be as shown in the illustrated case 1330.

In addition, when the projection_scheme field is set to 5, that is, the projection_scheme scheme indicates the panoramic projection scheme, for example, as shown in (d) of FIG. 13b, the projection_scheme field related metadata can include a panoramic_height field. The panoramic_height field can indicate the height of a panorama applied when 360 video data is mapped to, that is, projected on a 2D image.

Meanwhile, when only a region of an image frame is an active video area, as described above, the active video area indicated by the aforementioned cropped region related metadata may be as follows.

Figure 14:
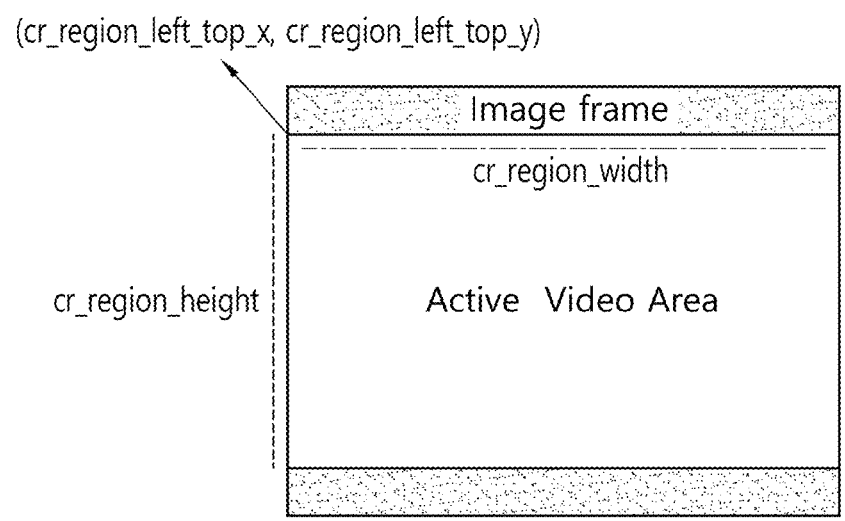
FIG. 14 illustrates an example of an active video area represented by metadata associated with a cropped region.

FIG. 14 illustrates an example of an active video area represented by the cropped region related metadata. The aforementioned cr_region_left_top_x field can indicate the x coordinate of the left top of a region to be displayed on a screen in an image frame or an active video area in the image frame. In addition, the cr_region_left_top_y field can indicate the y coordinate of the left top of a region to be displayed on a screen in an image frame or an active video area in the image frame. Further, the cr_region_width field can indicate the width of a region to be displayed on a screen in an image frame or an active video area in the image frame. Further, the cr_region_height field can indicate the height of a region to be displayed on a screen in an image frame or an active video area in the image frame. The width and the height can be represented in units of pixels. The 360 video reception apparatus or the like can derive an active video area in an image frame based on the cr_region_left_top_x field, the cr_region_left_top_y field, the cr_region_width field and the cr_region_height field and process only data of the active video area or display the data on a screen.

Meanwhile, the aforementioned intrinsic_camera_params field and the extrinsic_camera_params field including information about each camera can be stored and signaled as in an embodiment shown in FIG. 15.

FIG. 15 shows an IntrinsicCameraParametersBox class and an ExtrinsicCameraParametersBox class according to an embodiment of the present invention.

The aforementioned intrinsic_camera_params field can include intrinsic parameters with respect to the corresponding camera. This field can be defined according to the illustrated IntrinsicCameraParametersBox class 1500.

The IntrinsicCameraParametersBox class can include camera parameters for linking pixel coordinates of an image point to coordinates in a camera reference frame which correspond to the image point.

The IntrinsicCameraParametersBox class can include a ref_view_id field, a prec_focal_length field, a prec_principal_point field, a prec_skew_factor field, a exponent_focal_length_x field, a mantissa_focal_length_x field, a exponent_focal_length_y field, a mantissa_focal_length_y field, an exponent_principal_point_x field, a mantissa_principal_point_x field, an exponent_principal_point_y field, a mantissa_principal_point_y field, an exponent_skew_factor field and/or a mantissa_skew_factor field.

The ref_view_id field can indicate a view_id for identifying a view of the corresponding camera. The prec_focal_length field can indicate the exponent of a maximum truncation error permitted for focal_length_x and focal_length_y. The maximum truncation error can be represented as $2^{(-prec\_focal\_length)}$. The prec_principal_point field can indicate the exponent of a maximum truncation error permitted for principal_point_x and principal_point_y. The maximum truncation error can be represented as $2^{(-prec\_principal\_point)}$.

The prec_skew_factor field can indicate the exponent of a maximum truncation error permitted for a skew factor. This can be represented as $2^{(-prec\_skew\_factor)}$.

The exponent_focal_length_x field can indicate the exponent part of a focal length in the horizontal direction. The mantissa_focal_length_x can indicate the mantissa part of the focal length of an i-th camera in the horizontal direction. The exponent_focal_length_y field can indicate the exponent part of a focal length in the vertical direction. The mantissa_focal_length_y can indicate the mantissa part of a focal length in the vertical direction.

The exponent_principal_point_x field can indicate the exponent part of a principal point in the horizontal direction. The mantissa_principal_point_x field can indicate the mantissa part of a principal point in the horizontal direction. The exponent_principal_point_y field can indicate the exponent part of a principal point in the vertical direction. The mantissa_principal_point_y field can indicate the mantissa part of a principal point in the vertical direction.

The exponent_skew_factor field can indicate the exponent part of a skew factor. The mantissa_skew_factor field can indicate the mantissa part of a skew factor.

The extrinsic_camera_params field can include extrinsic parameters with respect to the corresponding camera. This field can be defined according to the illustrated extrinsicCameraParametersBox class 1510.

The ExtrinsicCameraParametersBox class can include camera parameters which define the position and orientation of a camera reference frame based on the known world reference frame. That is, the ExtrinsicCameraParametersBox class can include parameters representing details of rotation and translation of each camera based on the world reference frame.

The ExtrinsicCameraParametersBox class can include a ref_view_id field, a prec_rotation_param field, a prec_translation_param field, an exponent_r[j][k] field, a mantissa_r[j][k] field, an exponent_t[j] field and/or a mantissa_t[j] field.

The ref_view_id field can indicate a view_id for identifying a view associated with intrinsic_camera parameters.

The prec_rotation_param field can indicate the exponent part of a maximum truncation error permitted for r[j][k]. This can be represented as 2-prec_rotation_param.

The prec_translation_param field can indicate the exponent part of a maximum truncation error permitted for t[j]. This can be represented as 2-prec_translation_param.

The exponent_r[j][k] field can indicate the exponent part of a (j, k) component of a rotation matrix. The mantissa_r[j][k] field can indicate the mantissa part of a (j, k) component of a rotation matrix. The exponent_t[j] field can indicate the exponent part of a j-th component of a translation vector. This can have a value in the range of 0 to 62. The mantissa_t[j] field can indicate the mantissa part of a j-th component of a translation vector.

Meanwhile, the RegionGroup class can include detailed region information according to projection schemes having the projection_scheme field as a variable, as described above. The RegionGroup class can be signaled as in an embodiment illustrated in FIG. 16.

FIG. 16 illustrates a RegionGroup class according to an embodiment of the present invention.

The RegionGroup class can include a group_id field, a coding_dependency field and/or a num_regions field like the aforementioned RegionGroupBox class. The RegionGroup class can include a region_id field, a horizontal_offset field, a vertical_offset field, a region_width field and/or a region_height field for each region depending on the value of the num_regions field value. These fields are defined as above.

The RegionGroup class can include a sub_region_flag field, a region_rotation_flag field, a region_rotation_axis field, a region_rotation field and/or region information according to each projection scheme.

The sub_region_flag field can indicate whether the corresponding region has been divided into sub-regions. The region_rotation_flag field can indicate whether the corresponding region has been rotated after corresponding 360 video data has been projected on a 2D image.

The region_rotation_axis field can indicate an axis which is a base of rotation when corresponding 360 video data is rotated. This field can indicate that rotation has been made based on the vertical axis and the horizontal axis of each image when set to 0x0 and 0x1. The region_rotation field can indicate a rotation direction and degree when corresponding 360 video data has been rotated.

The RegionGroup class can describe information about each region differently according to projection schemes.

When the projection_scheme field indicates the equirectangular projection scheme, the RegionGroup class can include a min_region_pitch field, a max_region_pitch field, a min_region_yaw field, a max_region_yaw field, a min_region_roll field and/or a max_region_roll field.

The min_region_pitch field and the max_region_pitch field can indicate a minimum value and a maximum value of a pitch of a region on a 3D space on which the corresponding region is reprojected. These may be a minimum value and a maximum value of $\varphi$ on a spherical surface when captured 360 video data is represented as the spherical surface.

The min_region_yaw field and the max_region_yaw field can indicate a minimum value and a maximum value of a yaw of a region on a 3D space on which the corresponding region is reprojected. These may be a minimum value and a maximum value of $\theta$ on a spherical surface when captured 360 video data is represented as the spherical surface.

The min_region_roll field and the max_region_roll field can indicate a minimum value and a maximum value of a roll of a region on a 3D space on which the corresponding region is reprojected.

When the projection_scheme indicates the cubic projection scheme, the RegionGroup class can include a cube_face field. When the sub_region_flag field indicates that the corresponding region has been divided into sub-regions, the RegionGroup class can include region information on sub-regions in a face indicated by the cube_face field, that is, a sub_region_horizontal_offset field, a sub_region_vertical_offset field, a sub_region_width field and/or a sub_region_height field.

The cube_face field can indicate which face of a cube applied during projection corresponds to the corresponding region. For example, this field can indicate that the corresponding region corresponds to the front, left, right, back, top and bottom of the cube when set to 0x00, 0x01, 0x02, 0x03, 0x04 and 0x05.

The sub_region_horizontal_offset field and the sub_region_vertical_offset field can indicate horizontal and vertical offset values of the left-top pixel of the corresponding sub-region based on the left-top pixel of the corresponding region. That is, the two fields can indicate relative x-coordinate and y-coordinate values of the left-top pixel of the corresponding sub-region based on the left-top pixel of the corresponding region.

The sub_region_width field and the sub_region_height field can indicate the width and the height of the corresponding sub-region using pixel values.

When the corresponding sub-region is reprojected on a 3D space, minimum/maximum widths of the region occupied by the corresponding sub-region in the 3D space can be inferred based on the values of the aforementioned horizontal_offset field, the sub_region_horizontal_offset field and the sub_region_width field. According to an embodiment, a min_sub_region_width field and a max_sub_region_width field may be added to explicitly signal the minimum/maximum widths.

Further, when the corresponding sub-region is reprojected on a 3D space, minimum/maximum heights of the region occupied by the corresponding sub-region in the 3D space can be inferred based on the values of the aforementioned vertical_offset field, the sub_region_vertical_offset field and the sub_region_height field. According to an embodiment, a min_sub_region_height field and a max_sub_region_height field may be added to explicitly signal the minimum/maximum heights.

When the projection_scheme field indicates the cylindrical projection scheme, the RegionGroup class can include a cylinder_face field. When the sub_region_flag field indicates that the corresponding region has been divided into corresponding sub-regions, the RegionGroup class can include a sub_region_horizontal_offset field, a sub_region_vertical_offset field, a sub_region_width field, a sub_region_height field, a min_sub_region_yaw field and/or a max_sub_region_yaw field.

The cylinder_face field can indicate which face of a cylinder applied during projection corresponds to the corresponding region. For example, this field can indicate that the corresponding region corresponds to the side, top and bottom of the cylinder when set to 0x00, 0x01 and 0x02.

The sub_region_horizontal_offset field, the sub_region_vertical_offset field, the sub_region_width field and the sub_region_height field have been described above.

The min_sub_region_yaw field and the max_sub_region_yaw field can indicate a minimum value and a maximum value of a yaw of a region on a 3D space on which the corresponding region is reprojected. These may be a minimum value and a maximum value of θ on a spherical surface when captured 360 video data is represented as the spherical surface. Since cylindrical projection scheme is applied, it is enough to signal only information about the yaw.

When the projection_scheme field indicates the pyramid projection scheme, the RegionGroup class can include a pyramid_face field.

When the sub_region_flag field indicates that the corresponding region has been divided into sub-regions, the RegionGroup class can include a sub_region_horizontal_offset field, a sub_region_vertical_offset field, a sub_region_width field, a sub_region_height field, a min_sub_region_yaw field and/or a max_sub_region_yaw field. The sub_region_horizontal_offset field, the sub_region_vertical_offset field, the sub_region_width field and the sub_region_height field have been described above.

The pyramid_face field can indicate which face of a pyramid applied during projection corresponds to the corresponding region. For example, this field can indicate that the corresponding region corresponds to the front, left-top, left-bottom, right-top and right-bottom of the pyramid when set to 0x00, 0x01, 0x02, 0x03 and 0x03.

When the projection_scheme field indicates the panoramic projection scheme, the RegionGroup class can include a min_region_yaw field, a max_region_yaw field, a min_region_height field and/or a max_region_height field. The min_region_yaw field and the max_region_yaw field have been described above.

The min_region_height field and the max_region_height field can indicate a minimum value and a maximum value of a region on a 3D space on which the corresponding region is reprojected. Since panoramic projection scheme is applied, it is enough to signal only information about the yaw and height.

When the projection_scheme field indicates projection without stitching, the RegionGroup class can include a ref_view_id field, a center_yaw field and a center_pitch field. The ref_view_id field can indicate a ref_view_id field of IntrinsicCameraParametersBox/ExtrinsicCameraParametersBox classes having camera intrinsic/extrinsic parameters of the corresponding region in order to associate camera intrinsic/extrinsic parameters associated with the corresponding region with the corresponding region.

The center_yaw field may be a yaw value of the center pixel of the corresponding region on a spherical surface reprojected on a 3D space. This may be a yaw value of the center pixel of the corresponding region in the capture space coordinate system reprojected on the 3D space. Here, the capture space coordinate system can refer to spherical coordinates representing a capture space.

The center_pitch field may be a pitch value of the center pixel of the corresponding region on a spherical surface reprojected on a 3D space. This may be a pitch value of the center pixel of the corresponding region in the capture space coordinate system reprojected on the 3D space.

The center_roll field may be a roll value of the center pixel of the corresponding region on a spherical surface reprojected on a 3D space. This may be a roll value of the center pixel of the corresponding region in the capture space coordinate system reprojected on the 3D space. Meanwhile, when the principal point of a front camera is assumed to be a point (r, 0, 0) of a spherical surface, the aforementioned center_yaw field, center_pitch field and center_roll field can indicate relative coordinate values with respect to the principal point of the front camera.

Further, the 360 video related metadata may have a box format defined by OMVideoConfigurationBox class, as described above. The 360 video related metadata according to all the above-described embodiments can be defined by the OMVideoConfigurationBox class. In this case, signaling fields can be included in this box according to each embodiment.

FIGS. 17a to 17f illustrate examples in which 360 video related metadata defined by OMVideoConfigurationBox class is signaled in respective boxes.

When 360 video data is stored and transmitted in a file format such as ISOBMFF or CFF (Common File Format), 360 video related metadata defined by the OMVideoConfigurationBox class can be included in each box of ISOBMFF. In this manner, the 360 video related metadata can be stored and signaled along with 360 video data.

As described above, the 360 video related metadata defined by the OMVideoConfigurationBox class can be included and delivered in various levels such as a file, a fragment, a track, a sample entry and can provide metadata about data of the level in which it is included according to the level (track, stream, sample group, sample, sample entry, and the like).

According to an embodiment of the present invention, the 360 video related metadata defined by the OMVideoConfigurationBox class can be included and delivered in the aforementioned tkhd box 1700. In this case, the tkhd box can include an omv_flag field and/or an omv_config field having OMVideoConfigurationBox class.

The omv_flag field may be a flag representing whether the corresponding video track includes 360 video (or omnidirectional video). 360 video data is included in the corresponding video track when this field is 1 and is not included in the corresponding video track when this field is 0. The omv_config field can be present depending on the value of this field.

The omv_config field can provide metadata about 360 video data included in the corresponding video track according to the aforementioned OMVideoConfigurationBox class.

According to another embodiment of the present invention, the 360 video related metadata defined by the OMVideoConfigurationBox class can be included and delivered in a vmhd box 1705. Here, the vmhd box (video media header box) is a lower box of the aforementioned trak box and can provide general presentation related information about the corresponding video track. In this case, the vmhd box may also include an omv_flag field and/or an omv_config field having OMVideoConfigurationBox class. The meaning of each field has been described above.

According to an embodiment, the 360 video related metadata may be simultaneously included in the tkhd box and the vmhd box. In this case, the 360 video related metadata included in the respective boxes may conform to different embodiments with respect to the 360 video related metadata.

When the 360 video related metadata is simultaneously included in the tkhd box and the vmhd box, values of the 360 video related metadata defined in the tkhd box can override values of the 360 video related metadata defined in the vmhd box. That is, when the values of the 360 video related metadata defined in the tkhd box are different from those included in the vmhd box, the values in the vmhd box can be used. When the 360 video related metadata is not included in the vmhd box, the 360 video related metadata in the tkhd box can be used.

According to another embodiment of the present invention, metadata defined by the OMVideoConfigurationBox class can be included and delivered in a trex box 1710. When a video stream is fragmented into one or more movie fragments and delivered in ISOBMFF, 360 video related metadata can be included and delivered in the trex box. Here, the trex box (track extend box) is a lower box of the aforementioned mvex box and can set up default values used by each movie fragment. This box can reduce the space and complexity in the traf box by providing the default values.

In this case, the trex box can include a default_sample_omv_flag field and/or a default_sample_omv_config field having OMVideoConfigurationBox class.

The default_sample_omv_flag field may be a flag representing whether 360 video samples are included in the corresponding video track fragment in the corresponding movie fragment. This field can indicate that the 360 video samples are included by default when set to 1. In this case, the trex box may further include a default_sample_omv_config field.

The default_sample_omv_config field can provide detailed metadata related to 360 video which can be applied to each video sample of the corresponding track fragment according to the aforementioned OMVideoConfigurationBox class. The metadata can be applied to the samples in the corresponding track fragment by default.

According to another embodiment of the present invention, 360 video related metadata defined by the OMVideoConfigurationBox class can be included and delivered in a tfhd box 1715. When a video stream is fragmented into one or more movie fragments and delivered in ISOBMFF, the 360 video related metadata can be included and delivered in the tfhd box. In this case, the tfhd box can also include an omv_flag field and/or an omv_config field having OMVideoConfigurationBox class. Although the meaning of each field has been described above, the two fields can describe detailed parameters related to 360 video for 360 video data of the corresponding track fragment included in the corresponding movie fragment.

When 360 video related metadata is included and delivered in a tfhd box 1720, the omv_flag field can be omitted and the default_sample_omv_config field can be included instead of the omv_config field according to an embodiment.

In this case, a tr_flags field of the tfhd box can indicate whether the 360 video related metadata is included in the tfhd box. For example, when the tf_flags field includes 0x400000, this field can indicate presence of default values of 360 video related metadata associated with video samples included in the corresponding video track fragment of the corresponding movie fragment. In this case, the default_sample_omv_config field may be present in the tfhd box. The default_sample_omv_config field has been described above.

According to another embodiment of the present invention, 360 video related metadata defined by the OMVideoConfigurationBox class can be included and delivered in the aforementioned trun box 1725. When a video stream is fragmented into one or more movie fragments and delivered in ISOBMFF, the 360 video related metadata can be included and delivered in the trun box. In this case, the trun box can also include an omv_flag field and/or an omv_config field having OMVideoConfigurationBox class. Although the meaning of each field has been described above, the two fields can describe detailed parameters related to 360 video which can be commonly applied to video samples of the corresponding track fragment included in the corresponding movie fragment.

When 360 video related metadata is included and delivered in a trun box 1730, the omv_flag field can be omitted according to an embodiment. In this case, a tr_flags field of the trun box can indicate whether the 360 video related metadata is included in the trun box.

For example, when the tf_flags field includes 0x008000, this field can indicate presence of 360 video related metadata which can be commonly applied to video samples included in the corresponding video track fragment of the corresponding movie fragment. In this case, the omv_config field in the trun box can provide 360 video related metadata which can be commonly applied to video samples according to OMVideoConfigurationBox class. Here, the omv_config field can be located at a box level in the trun box.

In addition, when the tf_flags field includes 0x004000, this field can indicate presence of 360 video related metadata which can be commonly applied to each video sample included in the corresponding video track fragment of the corresponding movie fragment. In this case, a trun box 1735 can include a sample_omv_config field which conforms to OMVideoConfigurationBox class at each sample level. The sample_omv_config field can provide 360 video related metadata applicable to each sample.

When 360 video related metadata is simultaneously included in the tfhd box and the trun box, values of the 360 video related metadata defined in the tfhd box can override values of the 360 video related metadata defined in the trun box. That is, when the values of the 360 video related metadata defined in the tfhd box are different from those included in the trun box, the values in the trun box can be used. When the 360 video related metadata is not included in the trun box, the 360 video related metadata in the tfhd box can be used.

According to another embodiment of the present invention, 360 video related metadata defined by the OMVideoConfigurationBox class can be included and delivered in a visual sample group entry 1740. When the same 360 video related metadata can be applied to one or more video samples present in one file or movie fragment, the 360 video related metadata can be included and delivered in the visual sample group entry. Here, the visual sample group entry 1740 can include an omv_flag field and/or an omv_config field having OMVideoConfigurationBox class.

The omv_flag field can indicate whether the corresponding sample group is a 360 video sample group. The omv_config field can describe detailed parameters related to 360 video which can be commonly applied to 360 video samples included in the corresponding video sample group according to the aforementioned OMVideoConfigurationBox class. For example, an initial view with respect to 360 video associated with each sample group can be set using the initial_view_yaw_degree field, the initial_view_pitch_degree field and the initial_view_roll_degree field of the OMVideoConfigurationBox class.

According to another embodiment of the present invention, 360 video related metadata defined by the OMVideoConfigurationBox class can be included and delivered in a visual sample group entry 1745. 360 video related metadata associated with each sample can be included and delivered in the visual sample group entry as initialization information necessary to decode each video sample present in one file or movie fragment. Here, the visual sample group entry 1745 can include an omv_flag field and/or an omv_config field having OMVideoConfigurationBox class.

The omv_flag field can indicate whether the corresponding video track/sample includes a 360 video sample. The omv_config field can describe 360 video related detailed parameters associated with the video track/sample.

According to another embodiment of the present invention, 360 video related metadata defined by the OMVideoConfigurationBox class can be included and delivered in an HEVC sample entry (HEVCSampleEntry) 1750. 360 video related metadata associated with each HEVC sample can be included and delivered in the HEVC sample entry as initialization information necessary to decode each HEVC sample present in one file or movie fragment. Here, the HEVC sample entry 1750 can include an omv_config field having OMVideoConfigurationBox class.

Similarly, 360 video related metadata may be included and delivered in AVC SampleEntry( ), AVC2SampleEntry( ), SVCSampleEntry( ) and MVCSampleEntry( ) in the same manner.

According to another embodiment of the present invention, 360 video related metadata defined by the OMVideoConfigurationBox class can be included and delivered in an HEVC configuration box (HEVCConfigurationBox) 1755. 360 video related metadata associated with each HEVC sample can be included and delivered in the HEVC configuration box 1755 as initialization information necessary to decode each HEVC sample present in one file or movie fragment. Here, the HEVC configuration box 1755 can include an omv_config field having OMVideoConfigurationBox class. The omv_config field has been described above.

Similarly, 360 video related metadata may be included and delivered in AVCConfigurationBox, SVCConfigurationBox and MVCConfigurationBox in the same manner.

According to another embodiment of the present invention, 360 video related metadata defined by the OMVideoConfigurationBox class can be included and delivered in HEVCDecoderConfigurationRecord 1760. 360 video related metadata associated with each HEVC sample can be included and delivered in the HEVCDecoderConfigurationRecord 1760 as initialization information necessary to decode each HEVC sample present in one file or movie fragment. Here, HEVCDecoderConfigurationRecord 1760 can include an omv_flag field and an omv_config field having OMVideoConfigurationBox class. The omv_flag field and the omv_config field have been described above.

Similarly, 360 video related metadata can be included and delivered in AVCecoderConfigurationRecord, SVCecoderConfigurationRecord and MVCecoderConfigurationRecord.

According to another embodiment of the present invention, 360 video related metadata defined by the OMVideoConfigurationBox class can be included and delivered in OmnidirectionalMediaMetadataSample.

360 video related metadata can be stored and delivered in the form of a metadata sample. The metadata sample can be defined as OmnidirectionalMediaMetadataSample. The OmnidirectionalMediaMetadataSample can include signaling fields defined in the aforementioned OMVideoConfigurationBox class.

Meanwhile, the 360 video related metadata defined by the OMVideoConfigurationBox class may be signaled as shown in FIGS. 18a and 18b.

FIGS. 18a and 18b illustrate examples in which 360 video related metadata defined by OMVideoConfigurationBox class is signaled in respective boxes.

According to another embodiment of the present invention, 360 video related metadata defined by the OMVideoConfigurationBox class can be included and delivered in a VrVideoBox.

To deliver 360 video related metadata, a VrVideoBox 1800 can be newly defined. The VrVideoBox 1800 can include the aforementioned 360 video related metadata. The box type of the VrVideoBox 1800 is 'vrvd' and it can be included and delivered in a scheme Information box ('schi'). The SchemeType of the VrVideoBox 1800 is 'vrvd' and this box can be present as a mandatory box in the case of SchemeType of 'vrvd'. The VrVideoBox 1800 can indicate that video data included in the corresponding track is 360 video data. Accordingly, when a type value in schi is vrvd, a receiver which cannot support VR video may not process data in the corresponding file format upon recognizing that it cannot process the data.

The VrVideoBox 1800 can include a vr_mapping_type field and/or an omv_config field defined by the OMVideoConfigurationBox class.

The vr_mapping_type field can be an integer value indicating a projection scheme used to project 360 video data in the form of a spherical surface on a 2D image format. This field can have the same meaning as the aforementioned projection_scheme.

The omv_config field can describe 360 video related metadata according to the aforementioned OMVideoConfigurationBox class.

According to another embodiment of the present invention, 360 video related metadata defined by the OMVideoConfigurationBox class can be included and delivered in an OmnidirectionalMediaMetadataSampleEntry 1810.

The OmnidirectionalMediaMetadataSampleEntry 1810 can define a sample entry of a metadata track which carries metadata for 360 video metadata. The OmnidirectionalMediaMetadataSampleEntry 1810 can include an omv_config field defined by the OMVideoConfigurationBox class. The omv_config field has been described above.

According to another embodiment of the present invention, 360 video related metadata defined by the OMVideoConfigurationBox class can be included and delivered in an OMVInformationSEIBox.

To deliver 360 video related metadata, an OMVInformationSEIBox 1820 can be newly defined. The OMVInformationSEIBox 1820 can include an SEI NAL unit including the aforementioned 360 video related metadata. The SEI NAL unit can include an SEI message including the 360 video related metadata. The OMVInformationSEIBox 1820 can include an omvinfosei field. The omvinfosei field can include the SEI NAL unit including the aforementioned 360 video related metadata. The 360 video related metadata has been described above.

The OMVInformationSEIBox 1820 can be included and delivered in VisualSampleEntry, AVCSampleEntry, MVCSampleEntry, SVCSampleEntry, HEVCSampleEntry, and the like.

For example, the VisualSampleEntry can include an omv_sei field indicating whether the OMVInformationSEIBox 1830 is applied. When the omv_sei field indicates that the OMVInformationSEIBox 1830 is applied to the VisualSampleEntry, 360 video related metadata included in the OMVInformationSEIBox 1830 can be copied to the VisualSampleEntry and applied.

In addition, an HEVCDecoderConfigurationRecord 1840 of the HEVCSampleEntry can include an omv_sei field indicating whether the OMVInformationSEIBox is applied, for example. When the omv_sei field indicates that the OMVInformationSEIBox is applied to the HEVCDecoderConfigurationRecord 1840, 360 video related metadata included in the OMVInformationSEIBox can be copied to the HEVCDecoderConfigurationRecord 1840 and applied.

Further, the HEVCSampleEntry 1850 can include an omv_sei field indicating whether the OMVInformationSEIBox is applied, for example. When the omv_sei field indicates that the OMVInformationSEIBox is applied to the HEVCSampleEntry 1850, 360 video related metadata included in the OMVInformationSEIBox can be copied to the HEVCSampleEntry 1850 and applied.

Meanwhile, one image frame can be divided into one or more regions and coded, and data of the regions can be stored through one or more tracks, for example. Here, a track can refer to a track in a file format such as ISOBMFF. One track can be used to store and deliver 360 video data corresponding to one region according to an embodiment. In this case, although a box associated with each track can include 360 video related metadata according to the OMVideoConfigurationBox class, the 360 video related metadata may be included only in a box associated with a specific track. In this case, other tracks which do not include the 360 video related metadata can include information indicating the specific track carrying the 360 video related metadata. Specifically, the other tracks can include a TrackReferenceTypeBox 1860. The TrackReferenceTypeBox 1860 may be a box used to indicate the corresponding track.

The TrackReferenceTypeBox 1860 can include a track_id field. The track_id field may be an integer value providing a reference between the corresponding track and other tracks in presentation. This field is not reused and may not have a value of 0.

The TrackReferenceTypeBox 1860 may have reference_type as a variable. The reference_type can indicate a reference type provided by the corresponding TrackReferenceTypeBox.

For example, when reference_type of the TrackReferenceTypeBox 1860 is 'hint', the track indicated by the track_id field can include original media of the track. The track corresponding to reference_type of 'hint' of the TrackReferenceTypeBox 1860 may be called a hint track.

In addition, when reference_type of the TrackReferenceTypeBox 1860 is 'cdsc', for example, the corresponding track can describe the track indicated by the track_id field.

Further, when reference_type of the TrackReferenceTypeBox 1860 is 'font', for example, the corresponding track can use a font transmitted through the track indicated by the track_id field or a font defined in the track indicated by the track_id field.

Further, when reference_type of the TrackReferenceTypeBox 1860 is 'hind', for example, the corresponding track can refer to the hint track. Accordingly, the reference_type can indicate the 'hind' type only when the hint track is used.

In addition, when reference_type of the TrackReferenceTypeBox 1860 is 'vdep', for example, it can indicate that the corresponding track includes auxiliary depth video information for the track indicated by the track_id field of the TrackReferenceTypeBox 1860.

Further, when reference_type of the TrackReferenceTypeBox 1860 is 'vplx', for example, it can indicate that the corresponding track includes auxiliary parallax video information for the track indicated by the track_id field of the TrackReferenceTypeBox 1860.

In addition, when reference_type of the TrackReferenceTypeBox 1860 is 'subt', it can indicate that the corresponding track includes a subtitle, timed text, overlay graphical information for the track indicated by the track_id field of the TrackReferenceTypeBox 1860. Alternatively, it can indicate that the corresponding track includes a subtitle, timed text, overlay graphical information for all tracks of an alternate group including the corresponding track.

Further, when reference_type of the TrackReferenceTypeBox 1860 is 'omvb', for example, this box can indicate a specific track carrying the aforementioned 360 video related metadata. Specifically, when each track including regions is decoded, basic base layer information among 360 video related metadata may be necessary. This box can indicate a specific track carrying the base layer information. The base layer information may be called basic information.

In addition, when reference_type of the TrackReferenceTypeBox is 'omvm', for example, this box can indicate a specific track carrying the aforementioned 360 video related metadata. Specifically, the 360 video related metadata can be stored and delivered as a separate individual track such as the aforementioned OmnidirectionalMediaMetadataSample( ). This box can indicate the individual track.

When 360 video data is rendered and provided to a user, the user can view only a part of the 360 video. Accordingly, it may be desirable that regions of the 360 video data be stored and delivered as different tracks. Here, when the respective tracks include the entire 360 video related metadata, transmission efficiency and capacity may deteriorate. Accordingly, it may be desirable that only a specific track include 360 video related metadata and the base layer information among the 360 video related metadata and other tracks access the specific track using TrackReferenceTypeBox as necessary.

The method of storing/delivering 360 video related metadata according to the present invention can be applied when a media file with respect to a 360 video is generated based on a box based file format such as ISOBMFF, a DASH segment operating in MPEG DASH is generated or an MPU operating in MPEG MMT is generated. A receiver (including a DASH client, an MMT client and the like) can acquire 360 video related metadata (flags, parameters, boxes, and the like) through a decoder and effectively provide the corresponding content.

The aforementioned OMVideoConfigurationBox may be present in a media file (e.g., ISOBMFF file), a DASH segment or boxes in an MMT MPU. In this case, 360 video related metadata defined in an upper box can be overridden by 360 video related metadata defined in a lower box. For example, when both the track header (tkhd) box and the video media header (vmhd) box include 360 video related flags and detailed metadata, 360 video flags defined in the track header box or values of fields (attributes) of the OMVideoConfigurationBox can be overridden by values defined in the video media header box.

Meanwhile, the aforementioned fields (attributes) in the OMVideoConfigurationBox can be included and delivered in SEI (supplemental enhancement information) or VUI (video usability information) of 360 video data.

Figure 19:
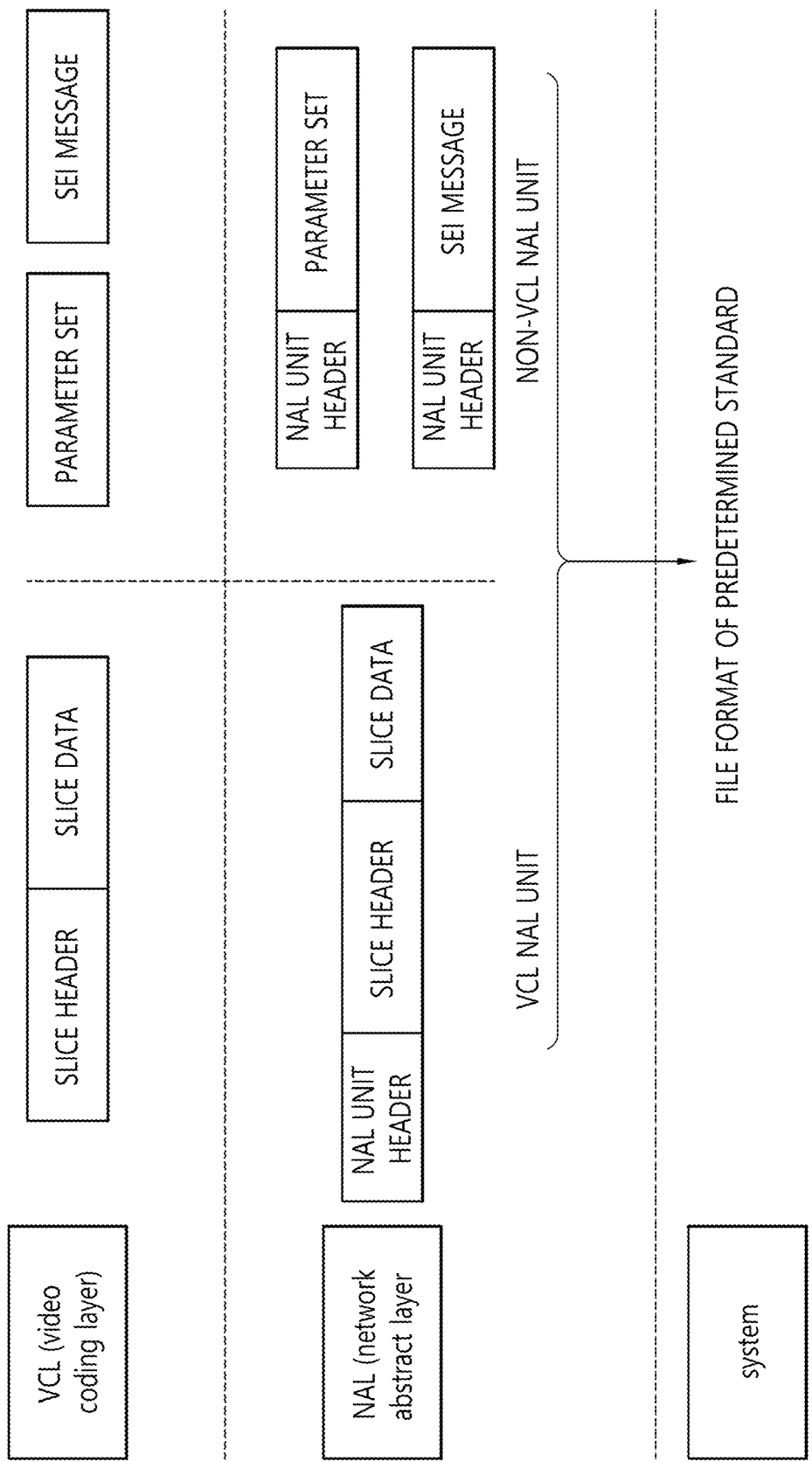
FIG. 19 illustrates a hierarchical structure for coded (360-degree) video data.

FIG. 19 illustrates a hierarchical structure for coded (360-degree) video data.

Referring to FIG. 19, coded video data can be classified into a video coding layer (VCL) which handles video coding and video and a network abstraction layer (NAL) interposed between the VCL and a lower system which stores and transmits coded video data.

A NAL unit which is a base unit of the NAL serves to map a coded video to a bit string of a lower system such as a file format according to a predetermined standard, RTP (Real-time Transport Protocol) and TS (Transport Stream).

Meanwhile, the VCL is used in a process of coding a parameter set corresponding to a header such as a sequence and a picture (picture parameter set, sequence parameter set, video parameter set, etc.) and a video, and an SEI message additionally necessary for a related procedure of a display is separated from information about a video (slice data). The VCL including information about a video image is composed of slice data and a slice header.

As shown, the NAL unit is composed of two parts: a NAL unit header; and a RB SP (Raw Byte Sequence Payload) generated in the VCL. The NAL unit header includes information about the type of the corresponding NAL unit.

The NAL unit is divided into a VCL NAL unit and a non-VCL NAL unit according to RB SP generated in the VCL. The VCL NAL unit refers to a NAL unit including information about a video image and the non-VCL NAL unit refers to a NAL unit including information (parameter set or SEI message) necessary to code a video image. The VCL NAL unit can be classified into various types according to the property and type of the picture included in the corresponding NAL unit.

The aforementioned fields (attributes) of the OMVideoConfigurationBox can be signaled through an SEI message of an AVC NAL unit or an HEVC NAL unit, as shown in FIG. 20.

FIGS. 20a and 20b illustrate an example in which the fields (attributes) in OMVideoConfigurationBox are signaled through an SEI message of an AVC NAL unit or an HEVC NAL unit. Referring to FIGS. 20a and 20b, the projection_scheme field, stitched_flag field, stereo_mode field, is_pitch_angle_less_180 field, is_yaw_angle_less_360 field, is_not_centered field, is_yaw_only field, initial_view_yaw_degree field, initial_view_pitch_degree field, initial_view_roll_degree field, is_cropped_region field, content_fov_flag field, camera_info_flag field and region_info_flag field can be signaled through the SEI message of the AVC NAL unit or the HEVC NAL unit. The meanings of these fields have been described above.

In addition, when the projection_scheme field is set to 0 or 3, the sphere_radius field can be signaled through the SEI message of the AVC NAL unit or the HEVC NAL unit.

Further, when the projection_scheme field is set to 1, the cube_front_width field, cube_front_height field and cube_height field can be signaled through the SEI message of the AVC NAL unit or the HEVC NAL unit.

Further, when the projection_scheme field is set to 2, the cylinder_radius field and the cylinder_height field can be signaled through the SEI message of the AVC NAL unit or the HEVC NAL unit.

Further, when the projection_scheme field is set to 4, the pyramid_front_width field, pyramid_front_height field, pyramid_front_rotation field and pyramid_height field can be signaled through the SEI message of the AVC NAL unit or the HEVC NAL unit.

Further, when the projection_scheme field is set to 5, the panorama_height field can be signaled through the SEI message of the AVC NAL unit or the HEVC NAL unit. The meanings of the aforementioned fields have been described above.

In addition, when the stitched_flag field is set to 1, that is, the stitched_flag field indicates that a stitching process has been performed, the num_camera field can indicate the number of cameras used to capture the corresponding 360 video data. Further, as many camera_center_pitch fields, camera_center_yaw fields and/or camera_center_roll fields as the number of cameras indicated by the num_camera field can be signaled through the SEI message of the AVC NAL unit or the HEVC NAL unit. The meanings of the aforementioned fields have been described above.

In addition, when the is_pitch_angle_less_180 field is set to 1, the min_pitch field and the max_pitch field can be signaled through the SEI message of the AVC NAL unit or the HEVC NAL unit. The meanings of the aforementioned fields have been described above.

Further, when the is_yaw_angle_less_360 field is set to 1, the min_yaw field and the max_yaw field can be signaled through the SEI message of the AVC NAL unit or the HEVC NAL unit. The meanings of the aforementioned fields have been described above.

Further, when the is_not_centered field is set to 1, the center_pitch field and the center_yaw field can be signaled through the SEI message of the AVC NAL unit or the HEVC NAL unit. The meanings of the aforementioned fields have been described above.

Further, when the is_cropped_region field is set to 1, the cr_region_left_top_x field, cr_region_left_top_y field, cr_region_width field and cr_region_height field can be signaled through the SEI message of the AVC NAL unit or the HEVC NAL unit. The meanings of the aforementioned fields have been described above.

In addition, when the content_fov_flag field is set to 1, the content_hfov_flag field and the content_vfov_flag field can be signaled through the SEI message of the AVC NAL unit or the HEVC NAL unit. The meanings of the aforementioned fields have been described above.

Further, when the camera_info_flag field is set to 1, the num_camera field can be signaled through the SEI message of the AVC NAL unit or the HEVC NAL unit. In addition, as many camera_center_pitch fields, camera_center_yaw fields and/or camera_center_roll fields as the number of cameras indicated by the num_camera field can be signaled through the SEI message of the AVC NAL unit or the HEVC NAL unit. The meanings of the aforementioned fields have been described above.

In addition, when the region_info_flag field is set to 1, the num_region field can be signaled through the SEI message of the AVC NAL unit or the HEVC NAL unit. The num_region field can indicate the number of regions constituting an image frame of the corresponding 360 video.

Meanwhile, the camera_info_flag field can indicate whether detailed information about a camera used to capture the corresponding 360 video data is signaled. When the value of the camera_info_flag field is true, that is, the camera_info_flag field is set to 1, for example, a decoding device (or 360 video reception apparatus) can receive and process SEI messages with respect to extrinsic parameters and intrinsic parameters of the camera. Specifically, the extrinsic parameter SEI message may be an SEI message including the fields (or attributes) of the aforementioned ExtrinsicCameraParametersBox and the intrinsic parameter SEI message may be an SEI message including the fields (or attributes) of the aforementioned IntrinsicCameraParametersBox.

In addition, the region_info_flag field can indicate whether detailed information of each region constituting an image frame of the corresponding 360 video is signaled. When the value of the region_info_flag field is true, that is, the region_info_flag field is set to 1, for example, the decoding device (or 360 video reception apparatus) can receive and process a region group SEI message of each region.

FIGS. 21a and 21b illustrate an example of the aforementioned signaled region group SEI message. Referring to FIGS. 21a and 21b, the group_id field, coding_dependency field, project_scheme field and num_regions field can be signaled through an SEI message. In addition, the region_id field, horizontal_offset field, vertical_offset field, region_width field and region_height field, sub_region_flag field and region_rotation_flag field with respect to each region can be signaled through the SEI message according to the value of the num_regions field. Further, when the region_rotation_flag field is set to 1, the region_rotation_axis field and the region_rotation field can be signaled through the SEI message. The meanings of the aforementioned fields have been described above.

In addition, when the projection_scheme field is set to 0 or 3, the min_region_pitch field, max_region_pitch field, min_region_yaw field, max_region_yaw field, min_region_roll field and max_region_roll field can be signaled through the SEI message. The meanings of the aforementioned fields have been described above.

Further, when the projection_scheme field is set to 1, the cube_face field can be signaled through the SEI message. Further, when the sub_region_flag field indicates that the corresponding region has been divided into sub-regions, for example, when the sub_region_flag field is set to 1, the sub_region_horizontal_offset field, sub_region_vertical_offset field, sub_region_width field and sub_region_height field with respect to sub-regions in a face indicated by the cube_face field can be signaled through the SEI message. The meanings of the aforementioned fields have been described above.

In addition, when the projection_scheme field is set to 2, the cylinder_face field can be signaled through the SEI message. Further, when the sub_region_flag field indicates that the corresponding region has been divided into sub-regions, for example, when the sub_region_flag field is set to 1, the sub_region_horizontal_offset field, sub_region_vertical_offset field, sub_region_width field, sub_region_height field, min_sub_region_yaw field and max_sub_region_yaw field can be signaled through the SEI message. The meanings of the aforementioned fields have been described above.

In addition, when the projection_scheme field is set to 4, the pyramid_face field can be signaled through the SEI message. Further, when the sub_region_flag field indicates that the corresponding region has been divided into sub-regions, for example, when the sub_region_flag field is set to 1, the sub_region_horizontal_offset field, sub_region_vertical_offset field, sub_region_width field, sub_region_height field, min_sub_region_yaw field and max_sub_region_yaw field can be signaled through the SEI message. The meanings of the aforementioned fields have been described above.

In addition, when the projection_scheme field is set to 5, the min_region_yaw field, max_region_yaw field, min_region_height field and max_region_height field can be signaled through the SEI message. The meanings of the aforementioned fields have been described above.

Further, when the projection_scheme field is set to 6, the ref_view_id field, camera_center_yaw field, camera_center_pitch field and camera_center_roll field can be signaled through the SEI message. Meanwhile, the camera_center_yaw field can be called a center_yaw field, the camera_center_pitch field can be called a center_pitch field, and the camera_center_roll field can be called a center_roll field. The meanings of the aforementioned fields have been described above.

Meanwhile, when the aforementioned SEI messages are included in a 360 video stream and signaled, the decoding device or the like can determine how to process/project/render the 360 video stream signaled based on the SEI messages and process/project/render the 360 video stream signaled based on the SEI messages. In addition, the aforementioned SEI messages can be used as a mechanism for delivering VR metadata to a file writer, a transport packetizer or other system elements in an encoding device.

Meanwhile, the fields (attributes) for 360 video of the present invention can be included and delivered in a DASH based adaptive streaming model.

Figure 22:
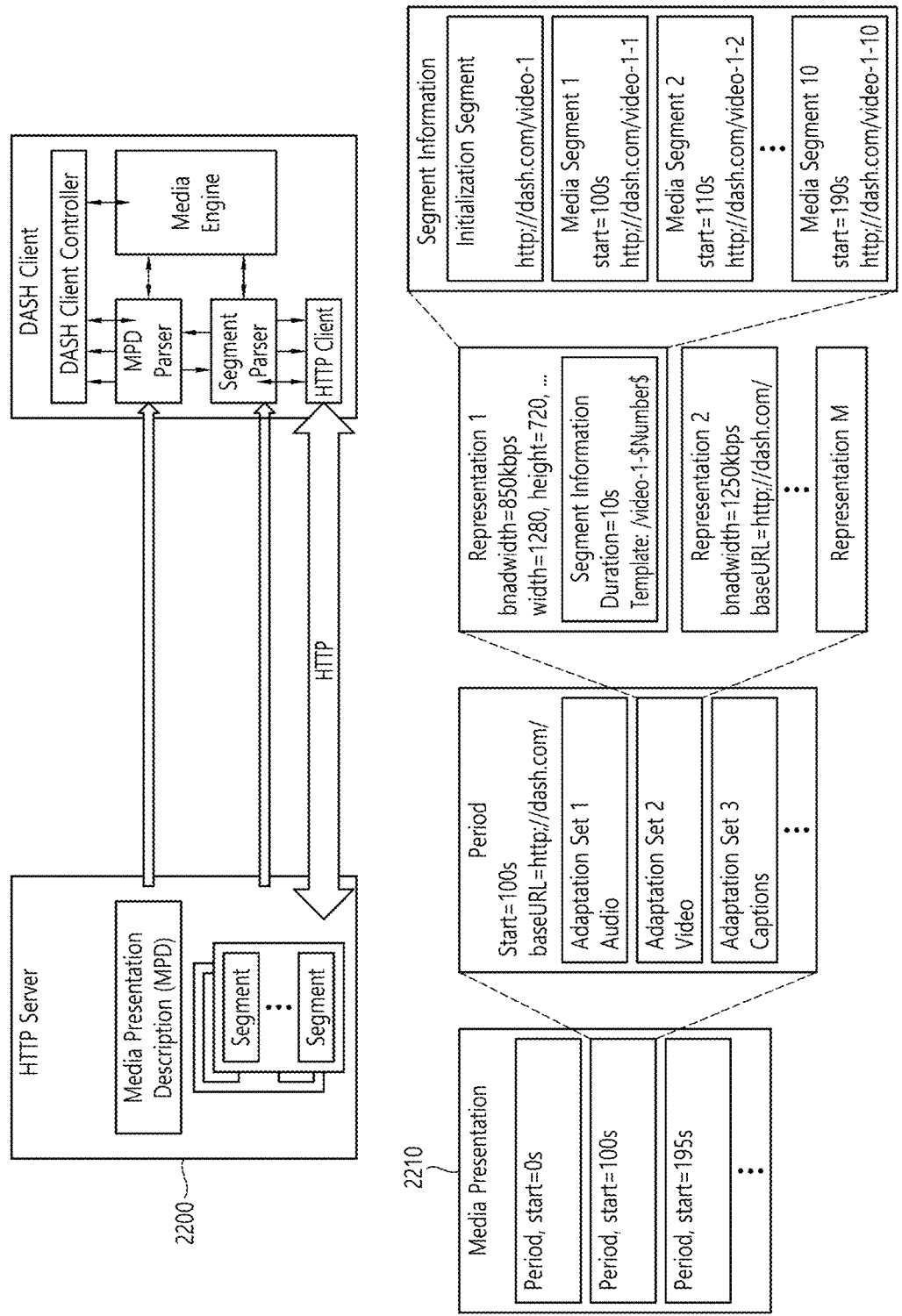
FIG. 22 illustrates an example of the overall operation of a DASH based adaptive streaming model.

FIG. 22 illustrates an example of the overall operation of a DASH based adaptive streaming model. The DASH based adaptive streaming model according to the illustrated embodiment 2200 describes operations between an HTTP server and a DASH client. Here, DASH (Dynamic Adaptive Streaming over HTTP) is a protocol for supporting adaptive streaming based on HTTP and can dynamically support streaming according to network state. Accordingly, seamless AV content reproduction can be provided.

First, a DASH client can acquire an MPD. The MPD can be delivered from a service provider such as an HTTP server. The DASH client can send a request for corresponding segments to the server using information on access to the segments which is described in the MPD. Here, the request can be performed based on a network state.

Upon acquisition of the segments, the DASH client can process the segments in a media engine and display the processed segments on a screen. The DASH client can request and acquire necessary segments by reflecting a reproduction time and/or a network state therein in real time (adaptive streaming). Accordingly, content can be seamlessly reproduced.

The MPD (Media Presentation Description) is a file including detailed information for a DASH client to dynamically acquire segments and can be represented in the XML format.

A DASH client controller can generate a command for requesting the MPD and/or segments based on a network state. Further, this controller can control an internal block such as the media engine to be able to use acquired information.

An MPD parser can parse the acquired MPD in real time. Accordingly, the DASH client controller can generate the command for acquiring necessary segments.

The segment parser can parse acquired segments in real time. Internal blocks such as the media block can perform specific operations according to information included in the segments.

An HTTP client can send a request for a necessary MPD and/or segments to the HTTP server. In addition, the HTTP client can transfer the MPD and/or segments acquired from the server to the MPD parser or a segment parser.

The media engine can display content on a screen using media data included in segments. Here, information of the MPD can be used.

A DASH data model may have a hierarchical structure 2210. Media presentation can be described by the MPD. The MPD can describe a temporal sequence of a plurality of periods which forms the media presentation. A period can represent one period of media content.

In one period, data can be included in adaptation sets. An adaptation set may be a set of a plurality of exchangeable media content components. Adaptation can include a set of representations. A representation can correspond to a media content component. Content can be temporally divided into a plurality of segments within one representation. This may be for accessibility and delivery. To access each segment, the URL of each segment may be provided.

The MPD can provide information related to media presentation, and a period element, an adaptation set element and a representation element can respectively describe the corresponding period, adaptation set and representation. A representation can be divided into sub-representations, and a sub-representation element can describe the corresponding sub-representation.

Here, common attributes/elements can be defined. The common attributes/elements can be applied to (included in) adaptation sets, representations and sub-representations. The common attributes/elements may include an essential property and/or a supplemental property.

The essential property is information including elements regarded as essential elements in processing data related to the corresponding media presentation. The supplemental property is information including elements which may be used to process data related to the corresponding media presentation. According to an embodiment, when descriptors which will be described later are delivered through the MPD, the descriptors can be defined in the essential property and/or the supplemental property and delivered.

Meanwhile, when a broadcast service for 360 video is provided through the DASH based adaptive streaming model or a 360 video is streamed through the DASH based adaptive streaming model, the above-described fields of 360 video related metadata can be signaled in a DASH based descriptor format included in a DASH MPD. That is, the above-described embodiments with respect to 360 video related metadata can be modified in the DASH based descriptor format. The DASH based descriptor format can include an EssentialProperty descriptor and a SupplementalProperty descriptor. A descriptor representing the aforementioned fields of 360 video related metadata can be included in AdaptationSet, Representation or SubRepresentation of the MPD.

FIGS. 23a to 23f illustrate an example of 360 video related metadata described in a DASH based descriptor format. As shown in 2300 of FIG. 23a, a DASH based descriptor can include an @schemeIdUri field, an @value field and/or an @id field.

The @schemeIdUri field can provide a URI for identifying the scheme or the corresponding descriptor. The @value field can have values defined by the scheme indicated by the @schemeIdUri field. That is, the @value field can have values of descriptor elements according to the corresponding scheme, which can be called parameters. These can be discriminated by ','. The @id field can indicate the ID of the corresponding descriptor. When descriptors have the same ID, the descriptors can include the same scheme ID, values and parameters.

In addition, as shown in 2310 of FIG. 23a, in the case of a descriptor which delivers 360 video related metadata, the @schemeIdURI field can have a value of urn:mpeg:dash:vr:201x. This can be a value identifying that the corresponding descriptor is a descriptor which delivers 360 video related metadata.

The @value of each descriptor delivering 360 video related metadata may have values shown in 2320 of FIGS. 23b to 23f. That is, parameters of @value discriminated by ',' can correspond to the aforementioned fields of 360 video related metadata. Although one of the above-described various embodiments with respect to 360 video related metadata is described as parameters of @value in 2320 of FIGS. 23b to 23f, it is possible to describe the above-described all embodiments with respect to 360 video related metadata as parameters of @value by replacing each signaling field by a parameter. That is, the 360 video related metadata according to the above-described all embodiments can also be described in the DASH based descriptor format.

In the illustrated 2320 of FIGS. 23b to 23f, each parameter can have the same meaning as the aforementioned signaling field in the same name. Here, M may mean that the corresponding parameter is mandatory, O may mean that the corresponding parameter is optional, and OD may mean that the corresponding parameter is optional with default. When a parameter value with OD is not provided, a predefined default value can be used as the parameter value. In the illustrated embodiment, a default value of each OD parameter is provided within a parenthesis.

Figure 24:
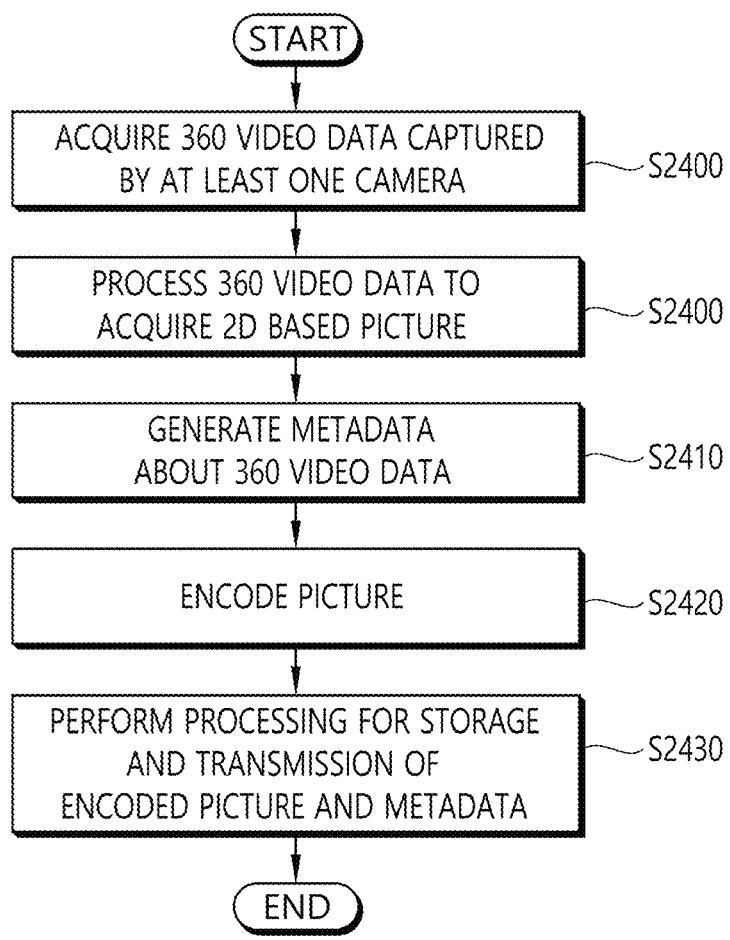
FIG. 24 schematically illustrates a 360 video data processing method performed by a 360 video transmission apparatus according to the present invention.

FIG. 24 schematically illustrates a 360 video data processing method performed by a 360 video transmission apparatus according to the present invention. The method illustrated in FIG. 24 may be performed by the 360 video transmission apparatus illustrated in FIG. 4. Specifically, S2400 in FIG. 24 can be performed by the data input unit of the 360 video transmission apparatus, S2410 can be performed by the projection processor of the 360 video transmission apparatus, S2420 can be performed by the metadata processor of the 360 video transmission apparatus, S2430 can be performed by the data encoder of the 360 video transmission apparatus, and S2440 can be performed by the transmission processor of the 360 video transmission apparatus, for example. The transmission processor may be included in the transmitter.

The 360 video transmission apparatus acquires 360 video data captured by at least one camera (S2400). The 360 video transmission apparatus may acquire 360 video data captured by at least one camera. The 360 video data may be a video captured by at least one camera. Further, the at least one camera may be a fish-eye camera, for example.

The 360 video transmission apparatus processes the 360 video data to acquire a 2D based picture (S2410). The 360 video transmission apparatus may perform projection according to a projection scheme for the 360 video data among various projection schemes. The 360 video transmission apparatus may determine whether the 360 video data is stitched. For example, the 360 video transmission apparatus may determine that the 360 video data is not stitched when the projection scheme corresponds to a specific scheme, that is, projection scheme information about the 360 video data indicates the specific scheme. Further, the various projection schemes may include the equirectangular projection scheme, the cubic projection scheme, the cylindrical projection scheme, the tile-based projection scheme, the pyramid projection scheme, the panoramic projection scheme and the specific scheme of directly projecting video data on a 2D image without stitching. When the projection scheme information indicates the specific scheme, the at least one camera may be a fish-eye camera. In this case, an image acquired by each camera may be a circular image.

Further, when the 360 video data is stitched, the 360 video transmission apparatus may stitch the 360 video data and project the stitched 360 video data on the 2D based picture. When the 360 video data is not stitched, the 360 video transmission apparatus may project the 360 video data on the 2D based picture without stitching. Here, the 2D based picture may be called a 2D image or a projected frame.

The 360 video transmission apparatus generates metadata about the 360 video data (S2420). Here, the metadata about the 360 video data may be called signaling information. The metadata may include a projection_scheme field, a stitched_flag field, a stereo_mode field, an is_pitch_angle_less_180 field, an is_yaw_angle_less_360 field, an is_not_centered field, an is_yaw_only field, an initial_view_yaw_degree field, an initial_view_pitch_degree field, an initial_view_roll_degree field, an is_cropped_region field, a content_fov_flag field, a camera_info_flag field and/or a region_info_flag field. Further, the metadata may include the aforementioned fields other than the above-described fields. The meanings of these fields have been described above. In addition, the projection_scheme field may be called projection scheme information and the stitched_flag field may be called stitching flag information. Further, the initial_view_yaw_degree field, the initial_view_pitch_degree field and the initial_view_roll_degree field may be referred to as initial view information. In addition, the is_pitch_angle_less_180 field may be called a pitch angle flag, the is_yaw_angle_less_360 field may be called a yaw angle flag, and the is_not_centered field may be called a center mapping flag. Further, the is_cropped_region field may be called a cropped region flag, the content_fov_flag field may be called an FOV (field of view) flag, the camera_info_flag field may be called a camera information flag, and the region_info_flag field may be called a region information flag.

Specifically, the metadata may include information about the center point of the picture, for example. The information about the center point of the picture can indicate whether the yaw value and the pitch value of spherical coordinates of a spherical surface, which correspond to the center point of the picture, is 0. In addition, when at least one of the yaw value and the pitch value of the spherical coordinates of the spherical surface, which correspond to the center point of the picture, is not 0, the information about the center point of the picture can indicate the value other than 0. Further, information about the center point of the picture can indicate whether the yaw value, the pitch value and the roll value of the spherical coordinates of the spherical surface, which correspond to the center point of the picture, is 0. In addition, when at least one of the yaw value, the pitch value and the roll value of the spherical coordinates of the spherical surface, which correspond to the center point of the picture, is not 0, the information about the center point of the picture can indicate the value other than 0. For example, the information about the center point of the picture may be represented by the aforementioned is_not_centered field and/or the center_pitch/center_yaw fields. Alternatively, the information about the center point of the picture may be represented based on a projection related box including center_pitch/center_yaw fields according to the ISO based media file format. In this case, it is possible to indicate that the center_pitch/center_yaw fields have a value of 0 based on presence or absence of the projection related box. Specifically, when the projection related box is not present, for example, the value of center_pitch (i.e., pitch value) can be regarded as 0 and the value of center_yaw (i.e., yaw value) can be regarded as 0.

In addition, when the projection format for the picture indicates the equirectangular projection, for example, the information about the center point of the picture may indicate the yaw value and the pitch value of the spherical coordinates of the spherical surface, which correspond to the center point of the picture. However, this is an example, and the information about the center point of the picture may indicate a projection structure corresponding to the center point of the picture or the yaw value and the pitch value of the spherical coordinates with respect to the center point of 3D geometry when the projection format for the picture indicates the cubic projection, cylindrical projection, tile-based projection, pyramid projection or panoramic projection.

In addition, the information about the center point of the picture may be configured based on a projection related box in the ISO (International Organization for Standardization) based media file format. In this case, when the projection format for the picture indicates equirectangular projection, cubic projection, cylindrical projection, tile-based projection, pyramid projection or panoramic projection and the projection related box is not present, the yaw and pitch values of the spherical coordinates of the spherical surface corresponding to the center of the picture can indicate 0. For example, the information about the center point of the picture can be represented by the aforementioned is_not_centered field and/or the center_pitch/center_yaw fields. Alternatively, information about the projection structure matched to the center point of the picture or yaw and pitch values of the center point of 3D geometry (e.g., the center point of a sphere) can be represented based on the a projection related box including center_pitch/center_yaw fields according to ISO based media file format. In this case, it is possible to indicate that the center_pitch/center_yaw fields have a value of 0 based on presence or absence of the projection related box. Specifically, when the projection related box is not present, for example, the value of center_pitch (i.e., pitch value) can be regarded as 0 and the value of center_yaw (i.e., yaw value) can be regarded as 0.

Meanwhile, the information about the center point of the picture may be included in a DASH MPD or an SEI message as described above.

In addition, as another example, the aforementioned metadata may include stitching flag information representing whether stitching of the 360 video data is performed. Further, the metadata may include camera information about the at least one camera used to capture the 360 video data.

For example, the metadata can include information about the center pixel of an image region acquired by each camera, and the information about the center pixel can represent yaw, pitch and roll values of spherical coordinates of a spherical surface which correspond to the center pixel of the image region. Further, when the at least one camera is a fish-eye cameras, the metadata can include information about the center pixel of an image region acquired by each camera. In this case, the image acquired by each camera may be a circular image.

In addition, the metadata may include information on the number of cameras, intrinsic camera information on each camera and extrinsic camera information on each camera. Here, the information on the number of cameras can indicate the aforementioned num_camera field and the information about the center pixel can indicate the aforementioned camera_center_pitch field, camera_center_yaw field and camera_center_roll field. Further, the information about the center pixel, the information on the number of cameras, the intrinsic camera information on each camera and the extrinsic camera information on each camera may be referred to as camera information, the metadata may include a camera information flag representing signaling of the camera information, and the camera information may be included in the metadata when the camera information flag indicates signaling of the camera information.

Alternatively, the metadata may include initial view information indicating an initial view region initially viewed by a user when the 360 video data is reproduced among the 360 video data, and the initial view information represented on the 3D space may be represented using pitch, yaw and roll values. The initial view information can represent the initial_view_yaw_degree field, initial_view_pitch_degree field and initial_view_roll_degree field.

Further, the metadata may include a cropped region flag representing whether the 360 video data is included in only a cropped region of the 2D image, and the metadata may include information related to the cropped region when the cropped region flag represents that the 360 video data is included in only the cropped region. The information related to the cropped region can represent the aforementioned cr_region_left_top_x field, cr_region_left_top_y field, cr_region_width field and cr_region_height field.

In addition, the metadata may include rotation flag information representing whether each region in the 2D image has been rotated, rotation axis information representing a rotation axis of each region, and rotation amount information representing a rotation direction degree of each region. The rotation flag information may represent the region_rotation_flag field, the rotation axis information may represent the region_rotation_axis field, and the rotation amount information may represent the region_rotation field.

Further, the metadata may further include a pitch angle flag indicating whether the angle range of a pitch supported by the 360 video data is less than 180 degrees, for example, and the metadata may further include a yaw angle flag indicating whether the angle range of a yaw supported by the 360 video data is less than 360 degrees. In addition, when the pitch angle flag indicates that the pitch angle range is less than 180 degrees, the metadata may further include minimum pitch information and maximum pitch information respectively indicating a minimum angle and a maximum angle of the pitch supported by the 360 video data. When the yaw angle flag indicates that the yaw angle range is less than 360 degrees, the metadata may further include minimum yaw information and maximum yaw information respectively indicating a minimum angle and a maximum angle of the yaw supported by the 360 video data. The minimum pitch information may represent the min_pitch field and the maximum pitch information may represent the max_pitch field. Further, the minimum yaw information may represent the min_yaw field and the maximum yaw information may represent the max_yaw field.

In addition, the metadata may include an FOV flag representing presence or absence of information about FOV (field of view) with respect to the 360 video data. When the FOV flag indicates presence of the information about FOV, the metadata may include information about horizontal FOV and information about vertical FOV. The information about horizontal FOV may represent the content_hfov field and the information about vertical FOV may represent the content_vfov field.

Meanwhile, the metadata can be transmitted through an SEI message. Further, the metadata may be included in AdaptationSet, Representation or SubRepresentation of an MPD (Media Presentation Description). Here, the SEI message may be used to supplement decoding of a 2D image or display of the 2D image on a 3D space.

The 360 video transmission apparatus encodes the picture (S2430). The 360 video transmission apparatus can encode the picture. Further, the 360 video transmission apparatus can encode the metadata.

The 360 video transmission apparatus performs processing for storage or transmission of the encoded picture and metadata (S2440). The 360 video transmission apparatus may encapsulate the encoded 360 video data and/or the metadata into a file. The 360 video transmission apparatus can encapsulate the encoded 360 video data and/or the metadata in a file format such as ISOBMFF and CFF or process the encoded 360 video data and/or the metadata into a form such as DASH segments in order to store or transmit the encoded 360 video data and/or the metadata. For example, the metadata may be included in boxes at various levels in ISOBMFF or included as data in a separate track in a file. Further, the 360 video transmission apparatus may encapsulate the metadata in a file. The 360 video transmission apparatus may perform processing for transmission on the encapsulated 360 video data according to file format. The 360 video transmission apparatus may process the 360 video data according to an arbitrary transmission protocol. The processing for transmission may include processing for delivery through a broadcast network or processing for delivery through a communication network such as a broad band. In addition, the 360 video transmission apparatus may perform processing for transmission on the metadata. The 360 video transmission apparatus may transmit the processed 360 video data and metadata through a broadcast network and/or a broad band.

Figure 25:
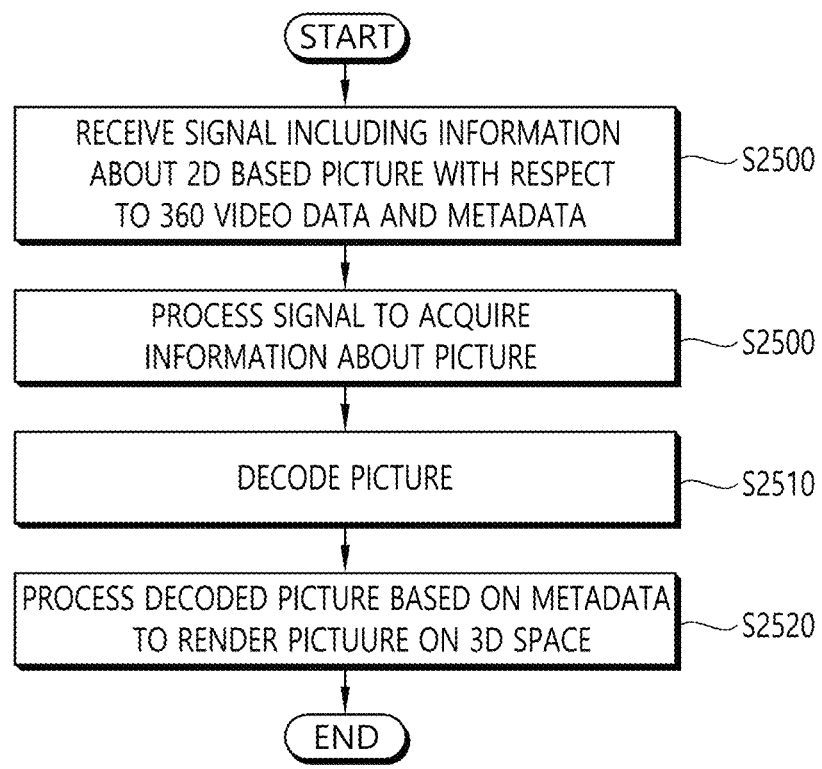
FIG. 25 schematically illustrates a 360 video data processing method performed by a 360 video reception apparatus according to the present invention.

FIG. 25 schematically illustrates a 360 video data processing method performed by a 360 video reception apparatus according to the present invention. The method illustrated in FIG. 25 may be performed by the 360 video reception apparatus illustrated in FIG. 5. Specifically, S2500 in FIG. 25 may be performed by the receiver of the 360 video reception apparatus, S2510 may be performed by the reception processor of the 360 video reception apparatus, S2520 may be performed by the data decoder of the 360 video reception apparatus and S2530 may be performed by the renderer of the 360 video reception apparatus, for example.

The 360 video reception apparatus receives a signal including information on a 2D based picture with respect to 360 video data and metadata about the 360 video data (S2500). The 360 video reception apparatus can receive the information on the 2D based picture with respect to the 360 video data and the metadata signaled from a 360 video transmission apparatus through a broadcast network. In addition, the 360 video reception apparatus may receive the information on the 2D based picture and the metadata through a communication network such as a broad band or a storage medium. Here, the 2D based picture may be called a 2D image or a projected frame.

The 360 video reception apparatus processes the received signal to acquire the information about the picture and the metadata (S2510). The 360 video reception apparatus can perform processing according to a transmission protocol on the received information on the picture and the metadata. Further, the 360 video reception apparatus can perform processing reverse to processing for transmission of the 360 video transmission apparatus.

Here, the metadata about the 360 video data may be referred to as signaling information. The metadata may include a projection_scheme field, a stitched_flag field, a stereo_mode field, an is_pitch_angle_less_180 field, an is_yaw_angle_less_360 field, an is_not_centered field, an is_yaw_only field, an initial_view_yaw_degree field, an initial_view_pitch_degree field, an initial_view_roll_degree field, an is_cropped_region field, a content_fov_flag field, a camera_info_flag field and/or a region_info_flag field. Further, the metadata may include the aforementioned fields other than the above-described fields. The meanings of these fields have been described above. In addition, the projection_scheme field may be called projection scheme information and the stitched_flag field may be called stitching flag information. Further, the initial_view_yaw_degree field, the initial_view_pitch_degree field and the initial_view_roll_degree field may be referred to as initial view information. In addition, the is_pitch_angle_less_180 field may be called a pitch angle flag, the is_yaw_angle_less_360 field may be called a yaw angle flag, and the is_not_centered field may be called a center mapping flag. Further, the is_cropped_region field may be called a cropped region flag, the content_fov_flag field may be called an FOV (field of view) flag, the camera_info_flag field may be called a camera information flag, and the region_info_flag field may be called a region information flag.

Specifically, the metadata may include information about the center point of the picture, for example. The information about the center point of the picture can indicate whether the yaw value and the pitch value of spherical coordinates of a spherical surface, which correspond to the center point of the picture, is 0. In addition, when at least one of the yaw value and the pitch value of the spherical coordinates of the spherical surface, which correspond to the center point of the picture, is not 0, the information about the center point of the picture can indicate the value other than 0. Further, information about the center point of the picture can indicate whether the yaw value, the pitch value and the roll value of the spherical coordinates of the spherical surface, which correspond to the center point of the picture, is 0. In addition, when at least one of the yaw value, the pitch value and the roll value of the spherical coordinates of the spherical surface, which correspond to the center point of the picture, is not 0, the information about the center point of the picture can indicate the value other than 0.

In addition, when the projection format for the picture indicates the equirectangular projection, for example, the information about the center point of the picture may indicate the yaw value and the pitch value of the spherical coordinates of the spherical surface, which correspond to the center point of the picture. However, this is an example, and the information about the center point of the picture may indicate a projection structure corresponding to the center point of the picture or the yaw value and the pitch value with respect to the center point of 3D geometry when the projection format for the picture indicates the cubic projection, cylindrical projection, tile-based projection, pyramid projection or panoramic projection.

In addition, the information about the center point of the picture may be configured based on a projection related box in the ISO (International Organization for Standardization) based media file format. In this case, when the projection format for the picture indicates equirectangular projection, cubic projection, cylindrical projection, tile-based projection, pyramid projection or panoramic projection and the projection related box is not present, the yaw and pitch values of the spherical coordinates of the spherical surface corresponding to the center of the picture can indicate 0. For example, the information about the center point of the picture can be represented by the aforementioned is_not_centered field and/or the center_pitch/center_yaw fields. Alternatively, information about the projection structure matched to the center point of the picture or yaw and pitch values of the center point of 3D geometry (e.g., the center point of a sphere) can be represented based on the a projection related box including center_pitch/center_yaw fields according to ISO based media file format. In this case, it is possible to indicate that the center_pitch/center_yaw fields have a value of 0 based on presence or absence of the projection related box. Specifically, when the projection related box is not present, for example, the value of center_pitch (i.e., pitch value) can be regarded as 0 and the value of center_yaw (i.e., yaw value) can be regarded as 0.

Meanwhile, the information about the center point of the picture may be included in a DASH MPD or an SEI message as described above.

In addition, as another example, the aforementioned metadata may include stitching flag information representing whether stitching of the 360 video data is performed. Further, the metadata may include camera information about the at least one camera used to capture the 360 video data.

For example, the metadata can include information about the center pixel of an image region acquired by each camera, and the information about the center pixel can represent yaw, pitch and roll values of spherical coordinates of a spherical surface which correspond to the center pixel of the image region. Further, when the at least one camera is a fish-eye camera, the metadata can include information about the center pixel of an image region acquired by each camera. In this case, the image acquired by each camera may be a circular image.

In addition, the metadata may include information on the number of cameras, intrinsic camera information on each camera and extrinsic camera information on each camera. Here, the information on the number of cameras can indicate the aforementioned num_camera field and the information about the center pixel can indicate the aforementioned camera_center_pitch field, camera_center_yaw field and camera_center_roll field. Further, the information about the center pixel, the information on the number of cameras, the intrinsic_camera information on each camera and the extrinsic camera information on each camera may be referred to as camera information, the metadata may include a camera information flag representing signaling of the camera information, and the camera information may be included in the metadata when the camera information flag indicates signaling of the camera information.

Alternatively, the metadata may include initial view information indicating an initial view region initially viewed by a user when the 360 video data is reproduced among the 360 video data, and the initial view information represented on the 3D space may be represented using pitch, yaw and roll values. The initial view information can represent the initial_view_yaw_degree field, initial_view_pitch_degree field and initial_view_roll_degree field.

Further, the metadata may include a cropped region flag representing whether the 360 video data is included in only a cropped region of the 2D image, and the metadata may include information related to the cropped region when the cropped region flag represents that the 360 video data is included in only the cropped region. The information related to the cropped region can represent the aforementioned cr_region_left_top_x field, cr_region_left_top_y field, cr_region_width field and cr_region_height field.

In addition, the metadata may include rotation flag information representing whether each region in the 2D image has been rotated, rotation axis information representing a rotation axis of each region, and rotation amount information representing a rotation direction degree of each region. The rotation flag information may represent the region_rotation_flag field, the rotation axis information may represent the region_rotation_axis field, and the rotation amount information may represent the region_rotation field.

Further, the metadata may further include a pitch angle flag indicating whether the angle range of a pitch supported by the 360 video data is less than 180 degrees, for example, and the metadata may further include a yaw angle flag indicating whether the angle range of a yaw supported by the 360 video data is less than 360 degrees. In addition, when the pitch angle flag indicates that the pitch angle range is less than 180 degrees, the metadata may further include minimum pitch information and maximum pitch information respectively indicating a minimum angle and a maximum angle of the pitch supported by the 360 video data. When the yaw angle flag indicates that the yaw angle range is less than 360 degrees, the metadata may further include minimum yaw information and maximum yaw information respectively indicating a minimum angle and a maximum angle of the yaw supported by the 360 video data. The minimum pitch information may represent the min_pitch field and the maximum pitch information may represent the max_pitch field. Further, the minimum yaw information may represent the min_yaw field and the maximum yaw information may represent the max_yaw field.

In addition, the metadata may include an FOV flag representing presence or absence of information about FOV (field of view) with respect to the 360 video data. When the FOV flag indicates presence of the information about FOV, the metadata may include information about horizontal FOV and information about vertical FOV. The information about horizontal FOV may represent the content_hfov field and the information about vertical FOV may represent the content_vfov field.

Meanwhile, the metadata can be transmitted through an SEI message. Further, the metadata may be included in AdaptationSet, Representation or SubRepresentation of an MPD (Media Presentation Description). Here, the SEI message may be used to supplement decoding of a 2D image or display of the 2D image on a 3D space.

The 360 video reception apparatus decodes the picture based on the information on the picture (S2520). The 360 video reception apparatus can decode the picture based on the information on the picture.

The 360 video reception apparatus processes the decoded picture based on the metadata to render the picture on a 3D space (S2530).

The above-described steps may be omitted according to an embodiment or replaced by other steps of performing similar/identical operations.

The 360 video transmission apparatus according to an embodiment of the present invention may include the above-described data input unit, stitcher, signaling processor, projection processor, data encoder, transmission processor and/ or transmitter. The internal components have been described above. The 360 video transmission apparatus and internal components thereof according to an embodiment of the present invention may perform the above-described embodiments with respect to the method of transmitting a 360 video of the present invention.

The 360 video reception apparatus according to an embodiment of the present invention may include the above-described receiver, reception processor, data decoder, signaling parser, reprojection processor and/or renderer. The internal components have been described above. The 360 video reception apparatus and internal components thereof according to an embodiment of the present invention may perform the above-described embodiments with respect to the method of receiving a 360 video of the present invention.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/ units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices.

What is claimed is:

1. A 360-degree video processing method performed by a 360-degree video transmission apparatus, the method comprising:
   acquiring a 360-degree video;
   obtaining an image related to the 360-degree video;
   generating metadata that includes information on a projection format, the projection format indicating an equirectangular projection or a cubic projection;
   encoding the image; and
   encapsulating the encoded image and the metadata for storage or transmission,
   wherein the metadata includes information on a yaw value and a pitch value for spherical coordinates for a three-dimensional (3D) space,
   wherein the metadata includes information about a circular image acquired by one or more cameras, and
   wherein the information about the circular image indicates spherical coordinates for the 3D space corresponding to a center of the circular image.

2. The 360-degree video processing method of claim 1, wherein, based on the projection format for the image indicating the equirectangular projection, the metadata includes information on the yaw value and the pitch value for the spherical coordinates of the 3D space corresponding to a center of the circular image.

3. The 360-degree video processing method of claim 1, wherein, based on the projection format for the image indicating the cubic projection, the metadata includes the information on the yaw value and the pitch value for the spherical coordinates of the 3D space corresponding to a center of a specific region in the circular image, wherein the specific region corresponds to a front face according to the cubic projection.

4. The 360-degree video processing method of claim 1, wherein the metadata is configured based on a projection related box in International Organization for Standardization (ISO) based media file format, and wherein, based on the projection format for the image being the equirectangular projection and the projection related box being absent, the yaw value and the pitch value for the spherical coordinates of the 3D space indicate 0.

5. The 360-degree video processing method of claim 1, wherein, based on at least one of the plurality of cameras being a fish-eye camera, the metadata includes information about the center pixel of an image acquired by the one or more cameras.

6. The 360-degree video processing method of claim 1, wherein the metadata includes initial view information indicating an initial view region initially viewed by a user, and
wherein the initial view information indicates the initial view region on the 3D space through a yaw value, a pitch value and a roll value.

7. The 360-degree video processing method of claim 1, wherein the metadata includes a field of view (FOV) flag indicating presence or absence of information about a field of view (FOV) with respect to the 360-degree video, and
wherein, based on the FOV flag indicating presence of the information about the FOV, signaling information includes information about a horizontal FOV and information about a vertical FOV.

8. A 360-degree video processing method performed by a 360-degree video reception apparatus, the method comprising:
receiving a 360-degree video that includes an encoded image;
obtaining metadata that includes information on a projection format, the projection format indicating an equirectangular projection or a cubic projection;
decoding the encoded image; and
rendering the decoded image on a three-dimensional (3D) space based on the metadata,
wherein the metadata includes information on a yaw value and a pitch value for spherical coordinates for the 3D space,
wherein the metadata includes information about a circular image acquired by one or more cameras, and
wherein the information about the circular image indicates spherical coordinates for the 3D space corresponding to a center of the circular image.

9. The 360-degree video processing method of claim 8, wherein, based on at least one of the yaw value and the pitch value being different than 0, the decoded image is rendered based on a rotation using the yaw value and the pitch value.

10. The 360-degree video processing method of claim 8, wherein, based on the projection format for the decoded image indicating the equirectangular projection, the metadata includes the information on the yaw value and the pitch value for the spherical coordinates of the 3D space corresponding to a center of the decoded image.

11. The 360-degree video processing method of claim 8, wherein, based on the projection format for the decoded image indicating the cubic projection, the metadata includes the information on the yaw value and the pitch value for the spherical coordinates of the 3D space corresponding to a center of a specific region in the decoded image, wherein the specific region corresponds to a front face according to the cubic projection.

12. The 360-degree video processing method of claim 8, wherein the metadata is configured based on a projection related box in International Organization for Standardization (ISO) based media file format, and
wherein, based on the projection format for the decoded image being the equirectangular projection and the projection related box being absent, the yaw value and the pitch value for the spherical coordinates of the 3D space indicate 0.

13. The 360-degree video processing method of claim 8, wherein, based on at least one of the plurality of cameras being a fish-eye camera, the metadata includes information about the center pixel of an image region acquired by the one or more cameras.

14. A 360-degree video reception apparatus comprising:
a receiver configured to receive 360-degree video data including an encoded image;
a data decoder configured to decode the encoded image; and
a renderer configured to process the decoded image based on metadata that includes information on a projection format, the projection format indicating an equirectangular projection or a cubic projection,
wherein the metadata includes information on a yaw value and a pitch value for spherical coordinates for a three-dimensional (3D) space,
wherein the metadata includes information about a circular image acquired by one or more cameras, and
wherein the information about the circular image indicates spherical coordinates for the 3D space corresponding to a center of the circular image.

15. The 360-degree video reception apparatus of claim 14, wherein, based on the projection format for the decoded image indicating the equirectangular projection, the metadata includes the information on the yaw value and the pitch value for the spherical coordinates of the 3D space corresponding to a center of the decoded image.

16. The 360-degree video reception apparatus of claim 14, wherein, based on the projection format for the decoded image indicating the cubic projection, the metadata includes the information on the yaw value and the pitch value for the spherical coordinates of the 3D space corresponding to a center of a specific region in the decoded image, wherein the specific region corresponds to a front face according to the cubic projection.

17. A 360-degree video transmission apparatus comprising:
a projection processor configured to generate a image of 360-degree video;
a data encoder configured to encode the image;
a metadata processor configured to generate metadata that includes information on a projection format, the projection format indicating an equirectangular projection or a cubic projection; and
a transmission processor configured to perform processing for storage of transmission of the encoded image and the metadata,
wherein the metadata includes information on a yaw value and a pitch value for spherical coordinates for a three-dimensional (3D) space,
wherein the metadata includes information about a circular image acquired by one or more cameras, and
wherein the information about the circular image indicates spherical coordinates for the 3D space corresponding to a center of the circular image.

* * * * *